(12) United States Patent
Ban et al.

(10) Patent No.: US 10,673,680 B2
(45) Date of Patent: Jun. 2, 2020

(54) ELECTRONIC DEVICE PROVIDING DIALOG CONTENTS, SERVER AND METHOD THEREOF

(71) Applicant: Samsung Electronics Co., Ltd., Gyeonggi-do (KR)

(72) Inventors: Hyong Jin Ban, Gyeonggi-do (KR); Tae Sun Yeoum, Seoul (KR); Yoon Sung Nam, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 77 days.

(21) Appl. No.: 15/982,049

(22) Filed: May 17, 2018

(65) Prior Publication Data

US 2018/0337818 A1    Nov. 22, 2018

(30) Foreign Application Priority Data

May 18, 2017 (KR) .................. 10-2017-0061771

(51) Int. Cl.
   *G06F 15/16*      (2006.01)
   *H04L 29/08*      (2006.01)
   (Continued)

(52) U.S. Cl.
   CPC ...... *H04L 29/08585* (2013.01); *G06F 3/0412* (2013.01); *G06F 3/0488* (2013.01); *H04L 12/1813* (2013.01); *H04L 29/06197* (2013.01); *H04L 29/0809* (2013.01); *H04L 29/08027* (2013.01); *H04L 51/02* (2013.01); *H04L 51/046* (2013.01); *H04L 67/02* (2013.01);
   (Continued)

(58) Field of Classification Search
   USPC .................. 709/206, 217, 202, 218, 219
   See application file for complete search history.

(56) References Cited

U.S. PATENT DOCUMENTS

| 8,630,961 B2 | 1/2014 | Beilby et al. |
| 9,282,157 B2 | 3/2016 | De Ding et al. |

(Continued)

OTHER PUBLICATIONS

European Search Report dated Oct. 16, 2018.

*Primary Examiner* — Lan Dai T Truong
(74) *Attorney, Agent, or Firm* — Cha & Reiter, LLC.

(57) ABSTRACT

An electronic device comprises a housing, a touchscreen display exposed through a part of the housing, at least one wireless communication circuit disposed inside the housing, at least one processor positioned inside the housing and electrically connected to the touchscreen display and the wireless communication circuit; and a memory electrically connected to the at least one processor and positioned inside the housing, wherein the memory stores a user interface for communicating with one or more external chatbots and stores instructions, when executed, that cause the at least one processor to provide access to the one or more external chatbots through the user interface; obtain user selection associated with a first chatbot of the one or more external chatbots, through the user interface; transmit a first connection request including a first phone number and a first identifier (ID) associated with the first chatbot, to an external server through the wireless communication circuit; and receive a first connection response including the first phone number and the first ID from the external server through the wireless communication circuit.

20 Claims, 11 Drawing Sheets

(51) Int. Cl.
*H04L 12/58* (2006.01)
*H04W 76/40* (2018.01)
*G06F 3/041* (2006.01)
*G06F 3/0488* (2013.01)
*H04L 12/18* (2006.01)
*H04L 29/06* (2006.01)
*H04M 1/02* (2006.01)
*H04M 1/26* (2006.01)
*H04W 4/12* (2009.01)
*H04W 8/26* (2009.01)

(52) U.S. Cl.
CPC .......... *H04L 67/141* (2013.01); *H04L 69/324* (2013.01); *H04M 1/0202* (2013.01); *H04M 1/26* (2013.01); *H04W 4/12* (2013.01); *H04W 8/26* (2013.01); *H04W 76/40* (2018.02); *H04M 2207/18* (2013.01); *H04M 2250/22* (2013.01); *H04M 2250/62* (2013.01); *H04M 2250/68* (2013.01)

(56) References Cited

U.S. PATENT DOCUMENTS

| | | |
|---|---|---|
| 9,369,410 B2 | 6/2016 | Capper et al. |
| 9,794,199 B2 | 10/2017 | Capper et al. |
| 2012/0041903 A1 | 2/2012 | Beilby et al. |
| 2012/0260263 A1 | 10/2012 | Edoja |
| 2014/0250195 A1 | 9/2014 | Capper et al. |
| 2014/0280464 A1 | 9/2014 | De Ding et al. |
| 2016/0352658 A1 | 12/2016 | Capper et al. |

ELECTRONIC DEVICE PROVIDING DIALOG CONTENTS, SERVER AND METHOD THEREOF

CROSS-REFERENCE TO RELATED APPLICATION(S)

This application is based on and claims priority under 35 U.S.C. § 119 to Korean Patent Application No. 10-2017-0061771, filed on May 18, 2017, in the Korean Intellectual Property Office, the disclosure of which is incorporated by reference herein its entirety.

BACKGROUND

1. Field

The present disclosure relates to an electronic device providing dialog content, a server, and a method thereof.

2. Description of Related Art

With the development of mobile communication technologies, an electronic device freely connects to a wireless/wired network while being easily portable. For example, a portable electronic device, such as a smartphone, a tablet PC, or the like, may support various functions such as access to Internet, playback of multimedia content as well as voice and message communication functions.

For the purpose of receiving the content or service desired by the user, the user of an electronic device needs to transmit the search keyword to the search engine. In the search using the search keyword as described above, it is inconvenient for the user to create the appropriate search keyword directly.

The above information is presented as background information only to assist with an understanding of the present disclosure. No determination has been made, and no assertion is made, as to whether any of the above might be applicable as prior art with regard to the present disclosure.

SUMMARY

A dialog content providing service based on natural language understanding is being tried to overcome the inconvenience. The dialog content providing service may analyze the semantics of a user's natural language request to provide appropriate content to the user in a dialogue format.

A dialog content providing service can be provided through a rich communication service (RCS). The mobile network operator (MNO) may provide a user with the dialog content providing service using the RCS through the message application installed in the terminal, without an additional subscription procedure. The dialog content providing service may be implemented based on the message application providing a dialog user interface (UI). Typically, over the top (OTT)-based message applications have been developed by a number of developers, and the OTT-based message applications may be provided worldwide.

Conventional RCS systems may transmit and/or receive messages using a session initiation protocol (SIP). The RCS system may represent the address of the other party transmitting and/or receiving messages in the form of uniform resource identifier (URI) or uniform resource locator (URL). However, message applications, for example, a short message service (SMS), need a phone number to deliver the message to the other party of the conversation. In the case where the dialog content providing service is provided through RCS Infra, the phone number may not be immediately available. On the other hand, chatbots are typically addressed by using URIs or URLs.

Aspects of the present disclosure are to address at least the above-mentioned problems and/or disadvantages and to provide at least the advantages described below. Accordingly, an aspect of the present disclosure is to provide an electronic device, a server, and a method for providing a service using a telephone number such that a user is capable of conveniently accessing the service providing dialog content.

In accordance with an embodiment of the disclosure, an electronic device comprises a housing, a touchscreen display exposed through a part of the housing, at least one wireless communication circuit disposed inside the housing, at least one processor positioned inside the housing and electrically connected to the touchscreen display and the wireless communication circuit; and a memory electrically connected to the at least one processor and positioned inside the housing, wherein the memory stores a user interface for communicating with one or more external chatbots and stores instructions, when executed, that cause the at least one processor to provide access to the one or more external chatbots through the user interface; obtain user selection associated with a first chatbot of the one or more external chatbots, through the user interface; transmit a first connection request including a first phone number and a first identifier (ID) associated with the first chatbot, to an external server through the wireless communication circuit; and receive a first connection response including the first phone number and the first ID from the external server through the wireless communication circuit.

In accordance with another aspect of the disclosure, a server includes at least one processor electrically connected to the wireless communication circuit; and a memory electrically connected to the at least one processor, wherein the memory stores instructions that, when executed, cause the at least one processor to: obtain a first connection request including a first phone number and a first ID from the electronic device; and identify a first chatbot of one or more chatbots based on the first phone number and the first ID.

According to various embodiments of the present disclosure, messages between a chatbot and an electronic device may be transmitted and/or received through an RCS network.

According to various embodiments of the present disclosure, the user's usability may increase through a chatbot service based on the phone number.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure will be described with reference to accompanying drawings. However, those of ordinary skill in the art will recognize that modification, equivalent, and/or alternative on the various embodiments described herein can be variously made without departing from the scope and spirit of the present disclosure.

Figure 1A:
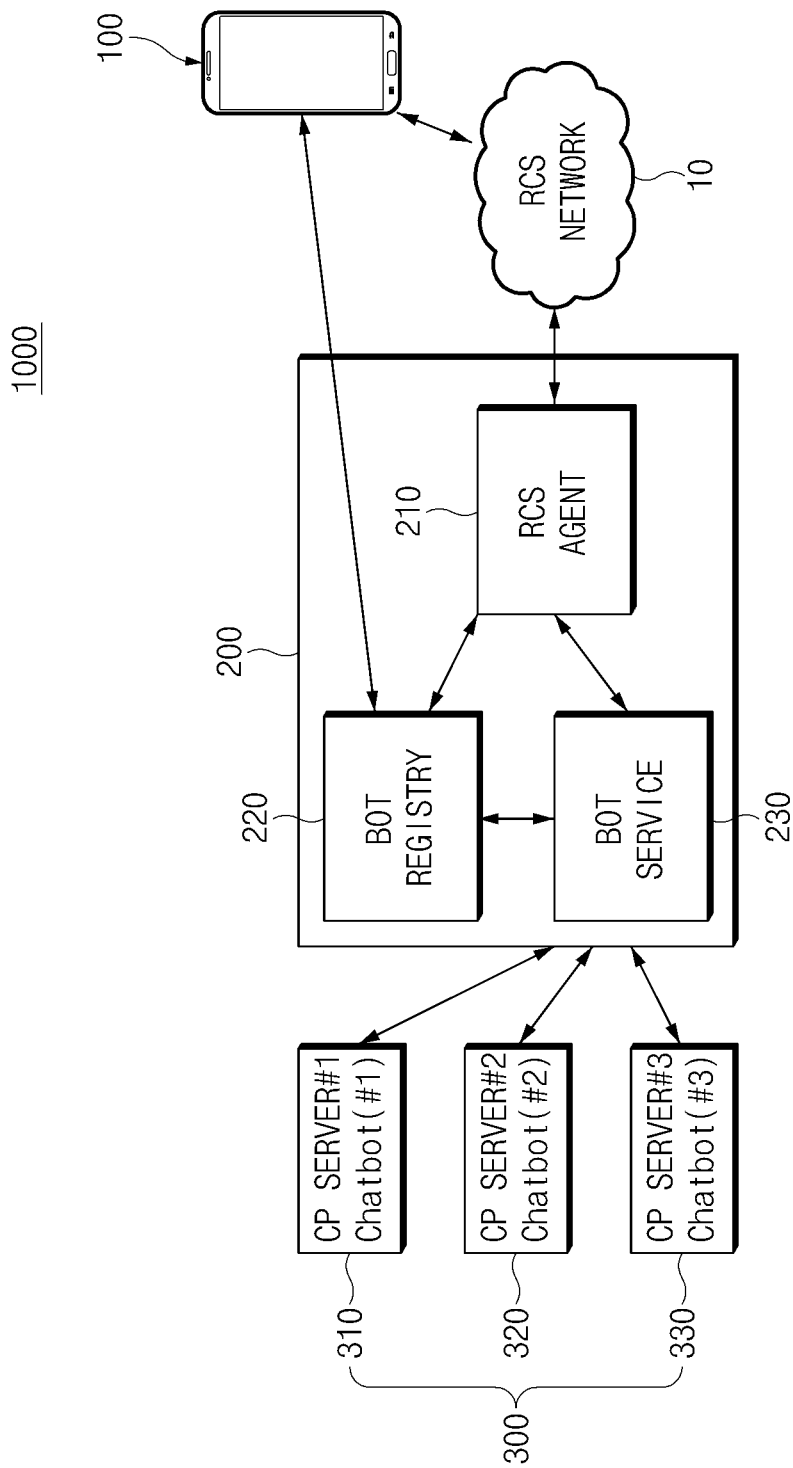
FIG. 1A, FIG. 1B and FIG. 1C illustrate a dialog content providing system and an electronic device providing dialog content, according to an embodiment.

FIG. 1A illustrates a dialog content providing system, according to an embodiment. In certain embodiments, the dialog content providing system permits an electronic device 100 to access a chatbot using a first communication protocol. In certain embodiments, the first communication protocol can be Rich Communication Suite (RCS) message. A platform server 200 provides a searchable registry of different chatbots 300. The registry associates a destination according to the first protocol for each chatbot 300. For example, the destination can be a Bot ID or a MSISDN. The electronic device 100 can access a chatbot 300 using the destination for communicating using the first communication protocol. The platform server 200 uses the destination to determine the identity of the chatbot 300. Additionally, the platform server 200 additionally converts messages from a first protocol to a second protocol used by the chatbot 300. The second protocol can be, for example, Hypertext Transmission Protocol (HTTP).

Referring to FIG. 1A, a dialog content providing system 1000 according to an embodiment may include an electronic device 100, a platform server 200, and content provider (CP) servers 310, 320, and 330 (collectively referred to as "300"). The electronic device 100, the platform server 200, and the CP servers 300 may be connected through, for example, data network (an example of a second network) (e.g., IP network or Internet).

The electronic device 100 may include at least one of, but not limited to, a portable communication device (e.g., smartphone), a computer device (e.g., a personal digital assistant (PDA), a tablet PC, a laptop PC, or a desktop PC), a portable multimedia device (e.g., e-book reader or MP3 player), or a wearable device. The electronic device 100 provides a user interface, wherein the user can select a chatbot from a plurality of chatbots. The electronic device 100 transmits a first connection request including a first phone number and a first identifier (ID) associated with the chatbot that the user selects to the platform server 200. The electronic device 100 receives a first connection response including the first phone number and the first ID from the platform server 200.

According to an embodiment, the electronic device 100 may access the platform server 200 through a data network (e.g., IP network or Internet) and may connect to a web page operated by the platform server 200 (so-called chatbot store) or may execute an application (chatbot store application). The user may search for the CP server 300 providing the desired service through the web page or the application, and may subscribe to the found CP server 300. The application may be a dedicated application. A bot service may be used to search for the appropriate CP server 300.

According to an embodiment, the electronic device 100 may communicate with the platform server 200 over an RCS network and may transmit and/or receive messages to and/or from the CP server 300 via the platform server 200. The message format between the electronic device 100 and the platform server 200 may be different than the message format between the platform server 200 and the CP servers 300. Accordingly, the platform server 200 converts the message format from the format between the electronic device 100 and the platform server 200 to the format between the platform server 200 and the CP server 300, and vice versa.

For example, the electronic device 100 may have a subscription to the first CP server 310. The electronic device 100 and the first CP server 310 may initiate a chat thread provided in the message application, based on the subscription. The message application according to an embodiment may be a native message application. When the chat thread is initiated, the electronic device 100 and the first CP server 310 may transmit and/or receive messages through the graphic user interface (GUI) (e.g., chatroom) provided by the native message application. For example, messages generated by the first CP server 310 may be transmitted to the electronic device 100 over an RCS network 10.

According to an embodiment, the format of the message generated by the electronic device 100 may be different from the format of the message generated by the platform server 200, or may comply with other protocols.

The platform server 200 may operate as a platform of the CP servers 300 and may relay messages between the CP servers 300 and the electronic device 100. For example, the platform server 200 may allow the electronic device 100 to search for the CP servers 300 or to transmit and/or receive messages between the CP servers 300 and the electronic device 100. The platform server 200 may serve as a conference focus. The platform server 200 may maintain and manage the connection of an SIP signal with the participants of a conference, and may perform the function of a conference server.

According to an embodiment, the platform server 200 may communicate with the CP servers 300 over a data network, and the platform server 200 may communicate with the electronic device 100 through the RCS network 10. Since the messaging format over the data network and the RCS network 10 are different, the platform server 200 may change the message format between the CP server 300 and the electronic device 100 through the RCS network 10. The format of the message generated by the CP servers 300 may be converted to the format of a message based on the RCS network 10, by the platform server 200. On the other hand, after being converted to the message of format based on the data network by the platform server 200, the message based on the RCS network 10, which is generated by the electronic device 100, may be transmitted to the CP servers 300.

According to an embodiment, the platform server 200 may include an RCS agent 210, a bot registry 220, and/or a bot service 230. As will be described in more detail below, the RCS agent 210 receives and transmits RCS formatted messages. The bot registry 220 stores the identity of each of the CP servers 310, 320, 330. The bot registry 220 can list the identity of each of the CP servers 310, 320, 330 with at least MSISDNs or phone numbers. Upon receipt of a phone number and identifier, the bot registry 220 can establish a connection with the identified CP server 310, 320, 330. The bot service 230 transmits and receives message from the identified CP server 310, 320, 330. The messages are forwarded to and from the electronic device 100 using the RCS agent 210. The configuration of the platform server 200 illustrated in FIG. 1A may be implemented with software and/or hardware. In addition, components of the platform server 200 of FIG. 1A may be respectively implemented in different devices or may be implemented in one device.

According to an embodiment, the RCS agent 210 serves as the interface between the electronic device 100 and the server 200. The RCS agent 210 may exchange messages with the electronic device 100 by using the RCS network 10. The RCS agent 210 may allow the electronic device 100 to receive dialog content by using the RCS network 10. For the purpose of transmitting a message from the electronic device 100 to the CP server 300, the RCS agent 210 may transmit the message to the bot service 230. The RCS agent 210 may access the bot registry 220 to obtain information about the CP server 300.

According to an embodiment, the bot registry 220 may store detailed information about the CP servers 300. For example, the detailed information may include the name, address, phone number, service types provided, or other property information of the dialog content providing service (or CP server). The bot registry 220 may be a module that stores the corresponding information when the developer of the dialog content providing service registers the service related information (e.g., chatbot information). The bot registry 220 may respond to the search and information request associated with the dialog content providing service from the electronic device 100. The bot registry 220 may process information request associated with the dialog content providing service from the RCS agent 210 or the bot service 230.

According to an embodiment, the bot service 230 acts as a relay between the electronic device 100 and the CP server 300. The bot service 230 can be a module that communicates with the CP servers 300 for the dialog content providing service. The bot service 230 may make a request for information associated with the dialog content providing service to the bot registry 220 and may transmit the message obtained from the CP server 300 to the RCS agent 210 to allow the RCS agent 210 to transmit the message to the electronic device 100. The bot service 230 may transmit the message obtained from the RCS agent 210 to the CP server 300. The bot service 230 may convert source and destination information obtained from the RCS agent 210, to information of a format capable of accessing the CP server 300. On the other hand, the bot service 230 may change the format of the source and destination information obtained from the CP server 300 such that the RCS agent 210 is capable of communicating with the electronic device 100.

The RCS network 10 may comply with the RCS (an example of first protocol) that is the international standard protocol for the next generation integrated message service.

The RCS may be an international standard for the next generation integrated message service adopted by the Global System for Mobile Communications Association (GSMA) and may provide various services (e.g., group chat, file transmission, state check of the recipient, message transmission state check, or the like) that are not provided by the conventional message service.

According to an embodiment, the RCS network 10 may be operated by an MNO and may specify subscribers (e.g., the electronic device 100 or the CP servers 300) based on at least a phone number (e.g., mobile station international subscriber directory number (MSISDN)).

According to an embodiment, unlike an OTT-based message application (e.g., Facebook Messenger™, Line™, Kakaotalk™, What's App™, or the like), a message application program (hereinafter, an application) using the RCS network 10 may be implemented with a native application. Accordingly, the user does not need to additionally and separately download or install a message application to use the RCS network 10 and may be provided by the electronic device 100. In addition, since utilizing a phone number to specify a subscriber, a message application using the RCS network 10 might not require the user to sign up or log in (or sign in).

According to an embodiment, for example, the CP servers 300 (310, 320, and 330) may be developed by each content provider (CP). The CP server 300 may provide an initial response message (so-called, welcome message), or a message associated with a service provided by the CP server 300, to the electronic device 100 through the platform server 200 and the RCS network 10.

According to an embodiment, the CP servers 300 may include a natural language processing (NLP) module (or a natural language understanding (NLU) module) that supports machine learning or artificial intelligence. The NLP module may derive the meaning of the natural language or the context included in the message received from the electronic device 100 and may automatically generate a message corresponding to the meaning or the context.

According to an embodiment, the CP servers 300 may implement a chatbot providing the dialog content providing service. For example, each of the CP servers 300 may implement one chatbot or may implement a plurality of chatbots. Hereinafter, for convenience of description, various embodiments will be described based on the fact that one CP server 300 correspond to one chatbot. In the present disclosure, the CP servers 300 may be referred to as a "chatbot 300" or "bot 300".

According to an embodiment, the chatbots 300 may transmit a message or content to the electronic device 100 through the platform server 200. The message generated by the chatbots 300 may comply with a second protocol different from the RCS. For example, the message generated by the chatbots 300 may comply with HTTP.

According to an embodiment, the electronic device 100, the user of the electronic device 100, or the platform server 200 may identify the chatbot 300 based on at least an RCS identifier. The same RCS identifier may be assigned to the chatbots 300 or different RCS identifiers may be assigned to the chatbots 300. According to an embodiment, the RCS identifier may have the form of the phone number (e.g., MSISDN) of a chatbot or URI.

According to an embodiment, the chatbots 300 sharing the same RCS identifier may be identified based on an additional identifier. For example, the additional identifier may be used to identify the chatbots 300 in the electronic device 100 and/or the platform server 200. According to an embodiment, the additional identifier may be a unique identifier (ID) of the chatbot or the extension of the RCS identifier.

According to an embodiment, the chatbot 300 may have its own location on the data network, and the chatbot 300 may have the location identifier or location information for communication with the platform server 200. For example, the location identifier may be a uniform resource identifier (URI) or a uniform resource locator (URL).

Figure 1B:
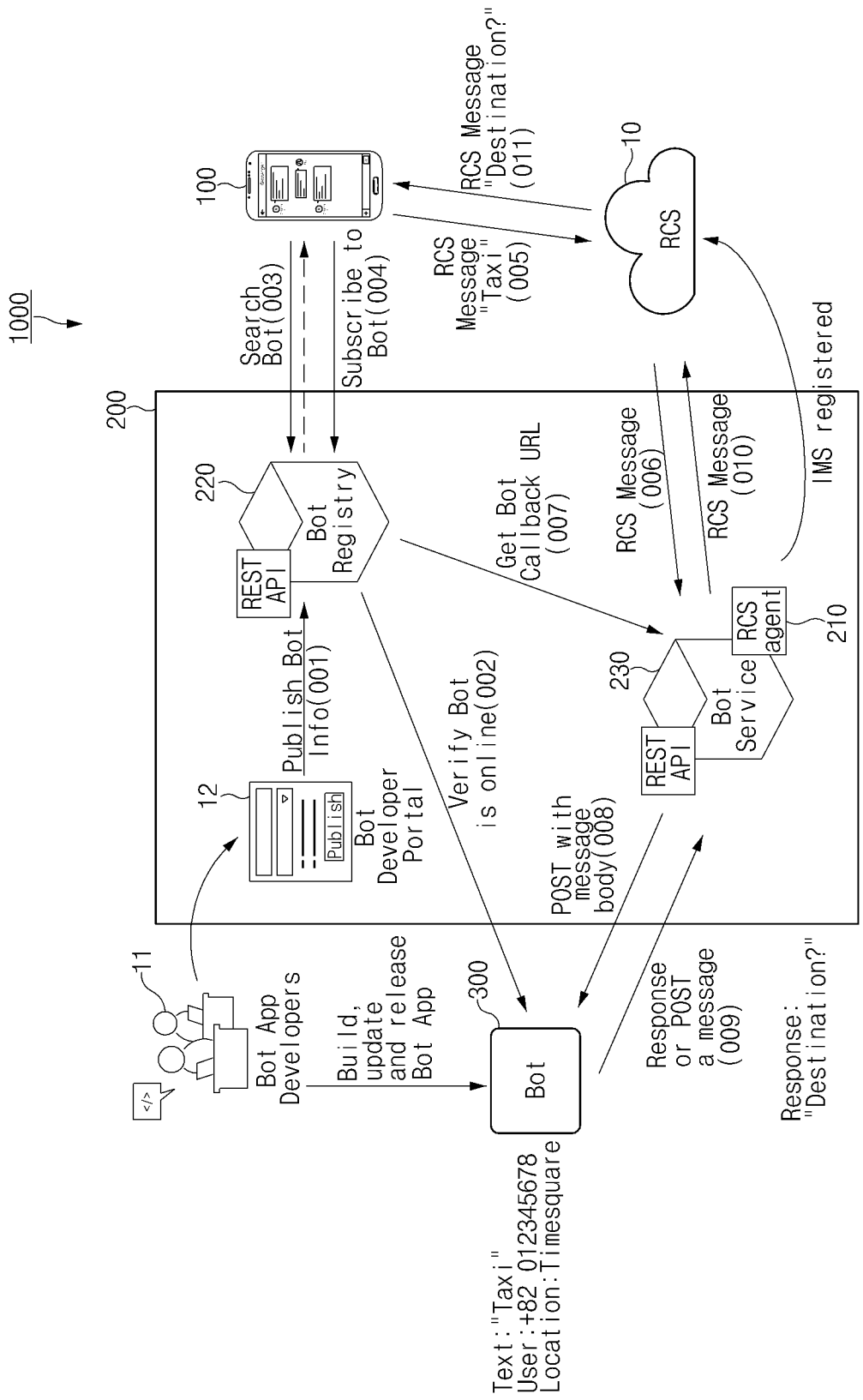

FIG. 1B illustrates a dialog content providing system, according to an embodiment.

Referring to FIG. 1B, the dialog content providing system 1000 according to an embodiment may include the electronic device 100, the platform server 200, and the chatbot 300. Although not illustrated, the electronic device 100, the platform server 200, and the chatbot 300 may be connected through, for example, data network (an example of a second network) (e.g., IP network or Internet). For example, the RCS agent 210 of the platform server 200 may be registered in an IP multimedia subsystem (IMS).

According to an embodiment, a developer 11 may build, update, and release the chatbot 300. For example, the developer 11 may access the developer portal web page of the chatbot store to register the chatbot 300 in the bot registry 220.

In operation 001, the developer 11 may register information of the chatbot 300 in the bot registry 220. For example, the developer 11 may access the developer portal web page of a "chatbot store" to register information such as the name, icon, description, URI of the chatbot 300.

According to various embodiments, in operation 001, the platform server 200 may generate an access token to transmit the access token to the developer 11 and/or may receive a self-signed certificate from the developer 11. The token and certificate may be used to improve the security of a message exchanged between the platform server 200 and the chatbot 300, thereafter.

In operation 002, the platform server 200 may verify the validity of the chatbot 300. For example, the bot registry 220 of the platform server 200 may determine whether the chatbot 300 is online, to verify the registered URI.

In operation 003, the electronic device 100 may access the chatbot store operated by the platform server 200, through the specified application and may browse the chatbots registered in the bot registry 220 of the platform server 200. For example, the electronic device 100 may receive a list of chatbots registered in the bot registry 220 or may search for and designate a chatbot that provides the desired service.

According to an embodiment, the format of the request message that the electronic device 100 transmits to the bot registry 220 of the platform server 200 to search for the chatbot 300 may include a header and a body. For example, the header and body may be described as Table 1 and Table 2, respectively.

TABLE 1

| Field | Type | Description |
| --- | --- | --- |
| Content-Type | String | Content type of the request body: application/json |

TABLE 2

| Field | Type | Description |
| --- | --- | --- |
| searchQuery optional | String | A search query for published bots. |
| pageNumber optional | String | A page index of search request, beginning with 1. |
| pageSize optional | String | A number of hot search result entry within single request. |

In addition, a message, which includes the search result for a chatbot and which the bot registry 220 of the platform server 200 provides to the electronic device 100 may have a message format as shown in Table 3. In the table 3, the list botInfoList of found chatbots may include the chatbot information BotInfo having the data format as shown in Table 4.

TABLE 3

| Field | Type | Description |
| --- | --- | --- |
| botInfoList | BotInfo[ ] | A list of bot search result. |
| searchTotalCount | int | Total number of the result. |

TABLE 4

| Field | Type | Description |
| --- | --- | --- |
| appId optional | string | appId(BotId) value generated when the Bot was created in Bot Registry |
| name optional | string | A name of a Bot. |
| publisher optional | string | A publisher of a Bot. |
| msisdn optional | string | MSISDN of a Bot. |
| mno optional | string | Mobile Network Provider of a Bot. |
| iconUrl optional | string | A URL to a bot icon. |
| brief optional | string | A brief description of a Bot. |
| description optional | string | A detailed description of a Bot. |

In operation 004, the electronic device 100 may obtain the RCS identifier of the chatbot 300 and may subscribe to the chatbot 300 based on the RCS identifier of the chatbot 300. At this time, the chatbot 300 may obtain user information of the electronic device 100 through the platform server 200.

According to an embodiment, the format of the message that the electronic device 100 transmits to the bot registry 220 of the platform server 200 to subscribe the chatbot 300 may include a header and a body. For example, the header and body may be described as Table 5 and Table 6, respectively.

TABLE 5

| Field | Type | Description |
| --- | --- | --- |
| Content-Type | String | Content type of the request body: application/json |

TABLE 6

| Field | Type | Description |
| --- | --- | --- |
| appId optional | String | appId(BotId) value generated when the Bot was created in Bot Registry |
| subscriberMsisdn optional | String | MSISDN of a subscriber. |
| subscriberName optional | String | A nick name of a subscriber. |

TABLE 6-continued

| Field | Type | Description |
| --- | --- | --- |
| code optional | String | A verification code retrieved from Bot Registry. |
| promotion optional | Boolean | If a subscriber subscribe for promotional messages. |

In operation 005, the electronic device 100 may start the conversation (chat thread) with a chatbot through the RCS network 10. For example, the electronic device 100 may set the RCS identifier (e.g., MSISDN) of the chatbot 300 to a destination and may transmit a message "Taxi" having the format (e.g., session initiation protocol (SIP) message format) according to RCS, to the RCS network 10.

In operation 006, the message generated by the electronic device 100 may be transmitted to the RCS agent 210 of the platform server 200 through the RCS network 10. The RCS agent 210 may be linked to the chatbot 300.

In operation 007, the bot service 230 may convert the destination of the message received by the RCS agent 210 in operation 006, to a URI format. To this end, the bot service 230 may refer to the correspondence relationship between the RCS identifier of the chatbot 300 stored in the bot registry 220 and the URI of the chatbot 300.

In operation 008, the bot service 230 may transmit a message to the chatbot 300 specified by the URI. The platform server 200 may establish the connection to the chatbot 300 based on hypertext transfer protocol over secure socket layer (HTTPS) for the purpose of transmitting the message. At this time, the platform server 200 may verify the chatbot 300 based on the certificate of the chatbot 300 registered in operation 001.

According to an embodiment, in operation 008, the format of the message that the bot service 230 of the platform server 200 transmits to the chatbot 300 may include a header and a body. For example, the header and body may be described as Table 7 and Table 8, respectively.

TABLE 7

| Field | Type | Description |
| --- | --- | --- |
| Content-Type | String | Content type of the request body: application/json |

TABLE 8

| Field | Type | Description |
| --- | --- | --- |
| messageType | String | "Message": Message from end users. |
| botID | String | AppID value generated when the Bot was created in Bot Registry. |
| chatID | String | chatID of the chat this message belongs to. |
| Message | Message | Actual message sent from the user. |
| Contacts | Contacts | Contact information for the message. |

In operation 009, the chatbot 300 may generate a response message "Destination?" associated with a message "Taxi" and may transmit the response message "Destination?" to the bot service 230 of the platform server 200. According to an embodiment, some fields of the response message may include an access token received in operation 001. The platform server 200 may verify whether the response message is generated and transmitted by a legitimate chatbot, by using the token.

According to an embodiment, the format of the message that the bot service 230 transmits to the chatbot 300 may include a header, a parameter, and a body. For example, the header, parameter, and body may be described as Table 9, Table 10, and Table 11, respectively.

TABLE 9

| Field | Type | Description |
| --- | --- | --- |
| Authorization | String | Access token given by Bot Registry. |
| Content-Type | String | Content type of the request body: application/json |

TABLE 10

| Field | Type | Description |
| --- | --- | --- |
| botID | String | BotID value generated when the Bot was created in Bot Registry. |

TABLE 11

| Field | Type | Description |
| --- | --- | --- |
| chatID optional | String | chatID of the destination chat thread. |
| userID optional | String | userID of the recipient. Required only for unsolicited messages to a follower (i.e. when chatID is not available). |
| userNumber optional | String | Phone number of the recipient. Required only for unsolicited messages to a non-follower (i.e. when both chatID and userID is not available). |
| Message | Message | Message to be sent to the user. |

In operation 010, the response message may be transmitted from the bot service 230 to the RCS agent 210, and the format of the response message may be converted into a format (e.g., SIP message format) according to the RCS by the RCS agent 210. The converted message may be transmitted to the RCS network 10.

In operation 011, the response message converted to a message may be transmitted to the electronic device 100 of a user through the RCS network 10.

Figure 1C:
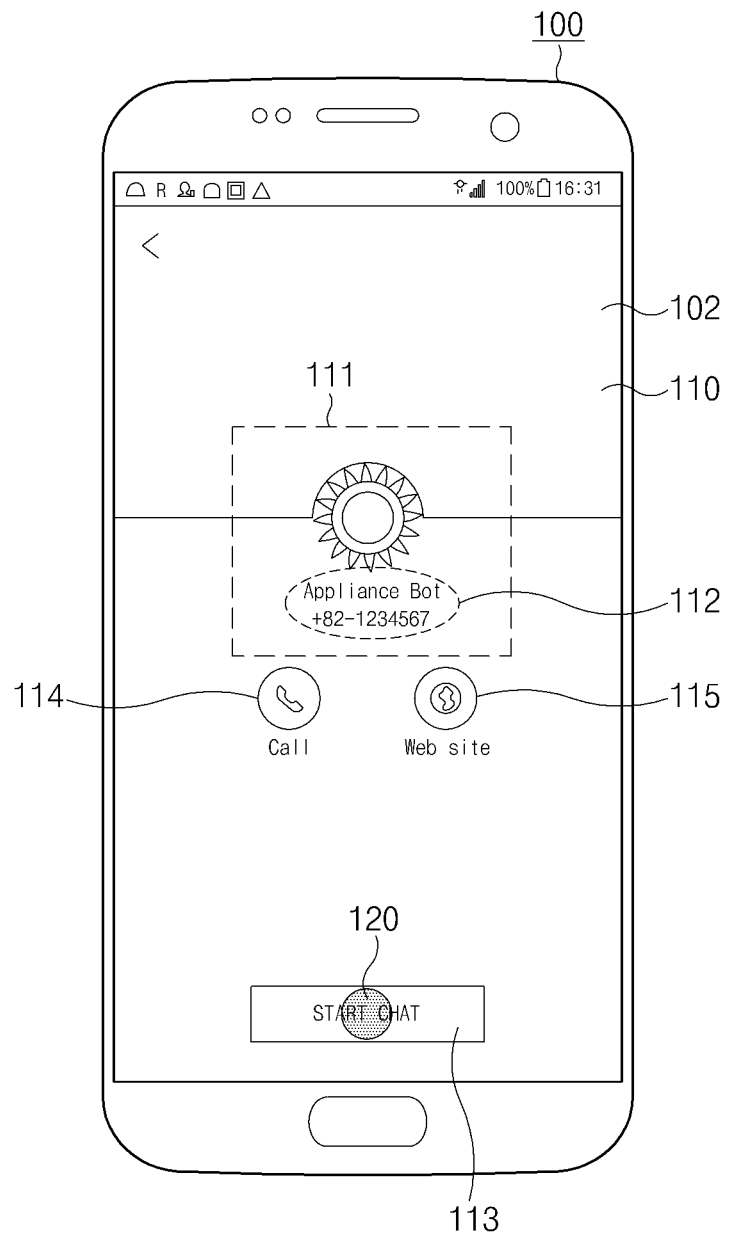

FIG. 1C is a view for describing a graphic user interface (GUI) of an electronic device, according to an embodiment.

Referring to FIG. 1C, a GUI screen 110 of the electronic device 100 in which a dialog content providing method according to an embodiment is preformed is illustrated. The GUI screen 110 may be an execution screen of a native message application of the electronic device 100. As described in FIG. 1A, the electronic device 100 may transmit and/or receive a message to and/or a chatbot (e.g., the chatbot 300 of FIG. 1A) through an RCS network (e.g., the RCS network 10 of FIG. 1A) and a platform server (e.g., the platform server 200 of FIG. 1A) by using the native message application. In the description of FIG. 1C, each of chatbots may already be registered in the platform server. Each of chatbots may perform an NLP module.

Referring to FIG. 1C, the electronic device 100 may execute the native message application and may output the GUI screen 110 to an input/output device 102 (e.g., touchscreen display). In the case where a user selects (e.g., touches) a UI object corresponding to a target chatbot desiring to chat, the GUI screen 110 may be a screen displayed in the input/output device 102 in response to the selection.

Referring to FIG. 1C, the GUI screen 110 may include information 111 of a chatbot selected by the user and a button for providing the user with a service. The information 111 of the chatbot may include an identifier 112 (e.g., 821234567) assigned to the chatbot and an image associated with the chatbot. For example, the service may be calling with the chatbot, chatting with the chatbot, visiting a website, and the like. For example, the button may include at least one of a button 113 for starting a chat with the chatbot 300, a soft button 114 set to call to the phone number, or a soft button 115 linked to a web site operated by the chatbot.

According to an embodiment, the user may select (120) the button 113 to start a chat with the chatbot (or to start a chat thread). The electronic device 100 may output a chatroom capable of transmitting and/or receiving a message with the chatbot, to the input/output device 102 in response to the selection 120.

According to an embodiment, the identifier 112 assigned to the chatbot may be an RCS identifier associated with the chatbot and/or an additional identifier associated with the chatbot. The RCS identifier of the chatbot may have the form of the phone number (e.g., MSISDN) of a chatbot or URI. For example, the additional identifier of the chatbot may be the unique identifier of the chatbot.

Figure 2:
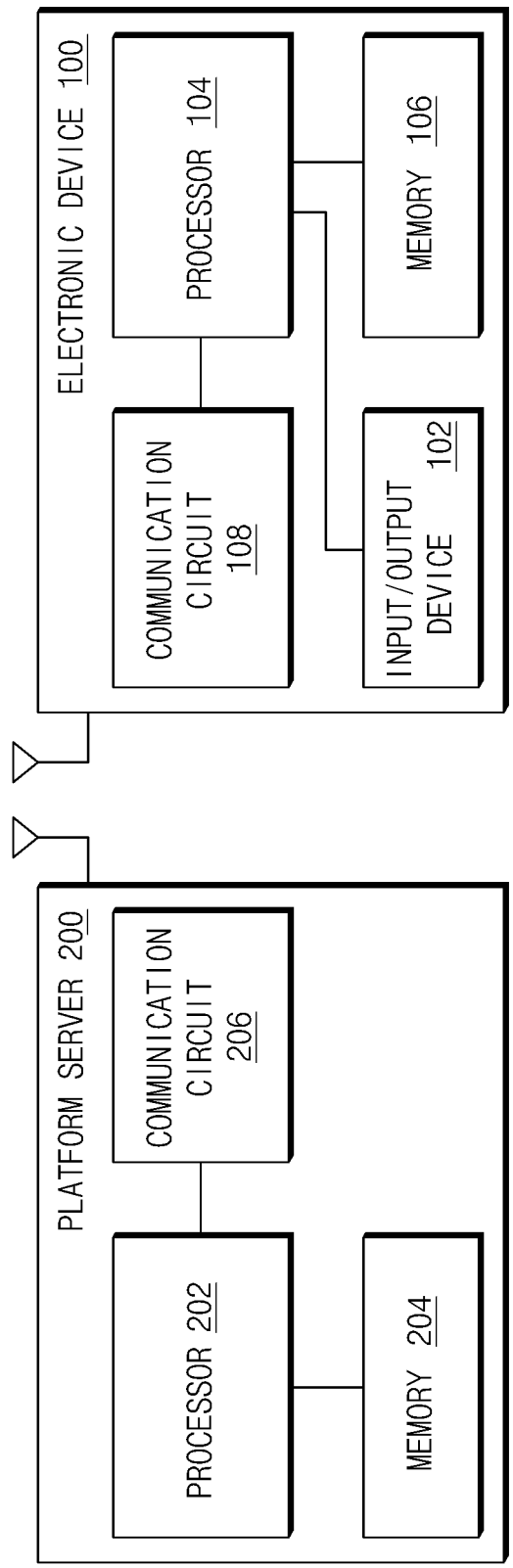
FIG. 2 is a block diagram of a configuration of an electronic device and a platform server, according to an embodiment.

FIG. 2 is a block diagram of a configuration of an electronic device and a platform server, according to an embodiment.

Referring to FIG. 2, the electronic device 100 (e.g., the electronic device 100 of FIG. 1A) may include the input/output device 102, at least one processor 104, a memory 106, and/or a communication circuit 108. The configuration of the electronic device 100 illustrated in FIG. 2 may be illustrative and may be variously changed according to various embodiments of the present disclosure. For example, the electronic device 100 may include a housing surrounding the internal components of the electronic device 100.

According to an embodiment, the input/output device 102 may obtain a user input or may output the result of performing an operation to a user. The input/output device 102 according to an embodiment may include a touchscreen display exposed through a part of the housing for obtaining the touch input of the user or a microphone for obtaining a voice input. The input/output device 102 according to an embodiment may include a display for outputting the result of performing an operation to the user. A dialog window in which chat content with chatbots (e.g., the chatbot 300 of FIG. 1A) is displayed may be displayed in the input/output device 102 according to an embodiment. The input/output device 102 may obtain user selection of a chatbot and receive user inputs for RCS messages.

According to an embodiment, the at least one processor 104 may be electrically connected to the input/output device 102, the memory 106, and the communication circuit 108. For the purpose of performing various embodiments disclosed of the present disclosure, the at least one processor 104 may control the components of the electronic device 100 or may perform an operation according to various embodiments. For example, the at least one processor 104 may operate an operating system or an application program to control at least one other component (e.g., hardware or software component) of the electronic device 100 connected to the at least one processor 104, and may process and calculate various types of data. The at least one processor 104 may load and process a command or data received from at least one of the other components into the memory 106 (e.g., volatile memory 932 of FIG. 9) and may store result data in the memory 106 (e.g., nonvolatile memory 934 in FIG. 9). The at least one processor 104 may provide access to at least one external chatbot through a user interface on the input/output device 102, may obtain user selection of a first chatbot (e.g., chatbot 310 of FIG. 1A) of the at least one external chatbot through the user interface, may transmit a first connection request including a first phone number and a first identifier (ID) associated with the first chatbot to an external server through the communication circuit 108, and may receive a first connection response including the first phone number and the first ID from the platform server 200 through the communication circuit 108. According to an embodiment, the processor 104 may display the first ID in the input/output device 102.

According to an embodiment, the at least one processor 104 may obtain user selection associated with a second chatbot (e.g., chatbot 320 of FIG. 1A) of the at least one chatbot through the user interface, may transmit a second connection request including the first phone number and a second ID associated with the second chatbot to the platform server 200 through the communication circuit 108, and may receive a second connection response including the first phone number and the second ID from the external server through the communication circuit 108.

According to an embodiment, the at least one processor 104 may obtain user selection associated with a third chatbot (e.g., chatbot 330 of FIG. 1A) of the at least one chatbot through the user interface, may transmit a third connection request including the second phone number and a third ID associated with the third chatbot to the platform server 200 through the communication circuit 108, and may receive a third connection response including the second phone number and the third ID from the external server through the communication circuit 108.

According to an embodiment, the memory 106 may store instructions that cause the processor 104 to perform various embodiments of the present disclosure. For example, the memory 106 may store, for example, at least one different software component, such as a command or data associated with the program, of the electronic device 100. The memory 106 may store a user interface that allows the user to communicate with external chatbots. For example, the memory 106 may store a native message application for the chat with a chatbot. The memory 106 according to an embodiment may store information about the chatbot or a dialog content providing service, obtained by user. For example, the memory 106 may store an RCS identifier associated with the chatbot and/or an additional identifier associated with the chatbot. The RCS identifier of the chatbot may have the form of the phone number (e.g., MSISDN) of a chatbot or URI. For example, the additional identifier of the chatbot may be the unique identifier of the chatbot.

According to an embodiment, the communication circuit 108 may support a first network communication or a second network communication being a heterogeneous network. The communication circuit 108 may transmit and/or receive a signal to and/or from the platform server 200 (e.g., the platform server 200 of FIG. 1A) through the first network communication or may transmit and/or receive a signal to and/or from the platform server 200 through the second network communication. According to an embodiment, the communication circuit 108 may include at least one communication circuit, such as, but not limited to a modulator/demodulator (modem), radio transmitter, receiver (transceiver). For example, the communication circuit 108 may include a first communication module supporting the first network communication and a second communication module supporting the second network communication.

According to an embodiment, at least one communication module may communicate through a first network (e.g., telephone network) compliant with a first protocol. The first protocol may include an RCS. The first network compliant with the RCS may be referred to as an "RCS network". The identifier of each of devices accessing the RCS network may be expressed in the form of MSISDN or URI. According to an embodiment, the at least one communication module may support cellular communication.

According to an embodiment, at least one communication module may communicate through a second network compliant with the second protocol. The second protocol may be a protocol (e.g., hypertext transfer protocol (HTTP)) different from the first protocol supporting the RCS. The second protocol might not support the RCS. The second protocol may include an Internet protocol or the like. For example, the second network compliant with the second protocol may include data network, Internet, IP network, or the like. The identifier of each of devices accessing the second network may be expressed in the form of URI or URL.

The platform server 200 illustrated in FIG. 2 may include a hardware configuration the same as or similar to the hardware configuration of the electronic device 100. For example, like the electronic device 100, the platform server 200 may include at least one processor 202, a memory 204, and a communication circuit 206.

The communication circuit 206 according to an embodiment may support the first protocol and the second protocol, and may include, but is not limited to a modulator/demodulator (modem), radio transmitter, receiver (transceiver).

According to an embodiment, the at least one processor 202 may operate an operating system or an application program to control at least one other component (e.g., hardware or software component) of the platform server 200 connected to the at least one processor 202, and may process and calculate various types of data. The at least one processor 202 may load and process a command or data received from at least one of the other components into the memory 204 (e.g., volatile memory 932 of FIG. 9) and may store result data in the memory 204 (e.g., nonvolatile memory 934 in FIG. 9).

According to an embodiment, the at least one processor 202 may exchange a first message compliant with the first protocol with the electronic device 100 and may exchange a second message compliant with the second protocol with a chatbot or a CP server (e.g., CP server 300 of FIG. 1A). The at least one processor 202 according to an embodiment may convert the format of the first message or may convert the format of the second message. For example, the processor 202 may perform conversion between an RCS-based message and a HTTP-based message, or vice versa. The memory 204 according to an embodiment may store information about the chatbot or information about the electronic device 100. For example, the information about the chatbot may include the name, address, phone number, service type to be provided, and other feature information of the chatbots. For example, the information about the electronic device 100 may include an address of the electronic device 100, a phone number, an electronic device ID, or the mapping relationship between the phone number and the electronic device ID.

According to an embodiment, the at least one processor 202 may obtain a first connection request including the first phone number and a first ID from the electronic device 100 and may identify a first chatbot (e.g., chatbot 310 of FIG. 1A) among the one or more chatbots based on the first phone number and the first ID. The at least one processor 202 may obtain a second connection request including the first phone number and a second ID from the electronic device 100 and may identify a second chatbot (e.g., chatbot 320 of FIG. 1A) among the one or more chatbots based on the first phone number and the second ID. The at least one processor 202 may obtain a third connection request including a second phone number and a third ID from the electronic device 100 and may identify a third chatbot (e.g., chatbot 330 of FIG. 1A) among the one or more chatbots based on the second phone number and the third ID.

According to an embodiment, the memory 204 may store instructions that cause the at least one processor 202 to perform various embodiments of the present disclosure. For example, the memory 204 may store, for example, at least one different software component, such as a command or data associated with the program, of the platform server 200.

The hardware configuration of the electronic device 100 and the platform server 200 is described in FIG. 2. The CP server or chatbot (e.g., chatbot 310, 320, or 330 of FIG. 1A) illustrated in FIG. 1A may include a hardware configuration the same as or similar to the hardware configuration of the electronic device 100 or the platform server 200.

Hereinafter, for convenience of description, an RCS identifier may be refer to as a "phone number" (e.g., MSISDN); the unique identifier of a chatbot may be refer to as a "bot ID"; and the unique identifier of the electronic device 100 or a user may be refer to as a "user ID".

Figure 3:
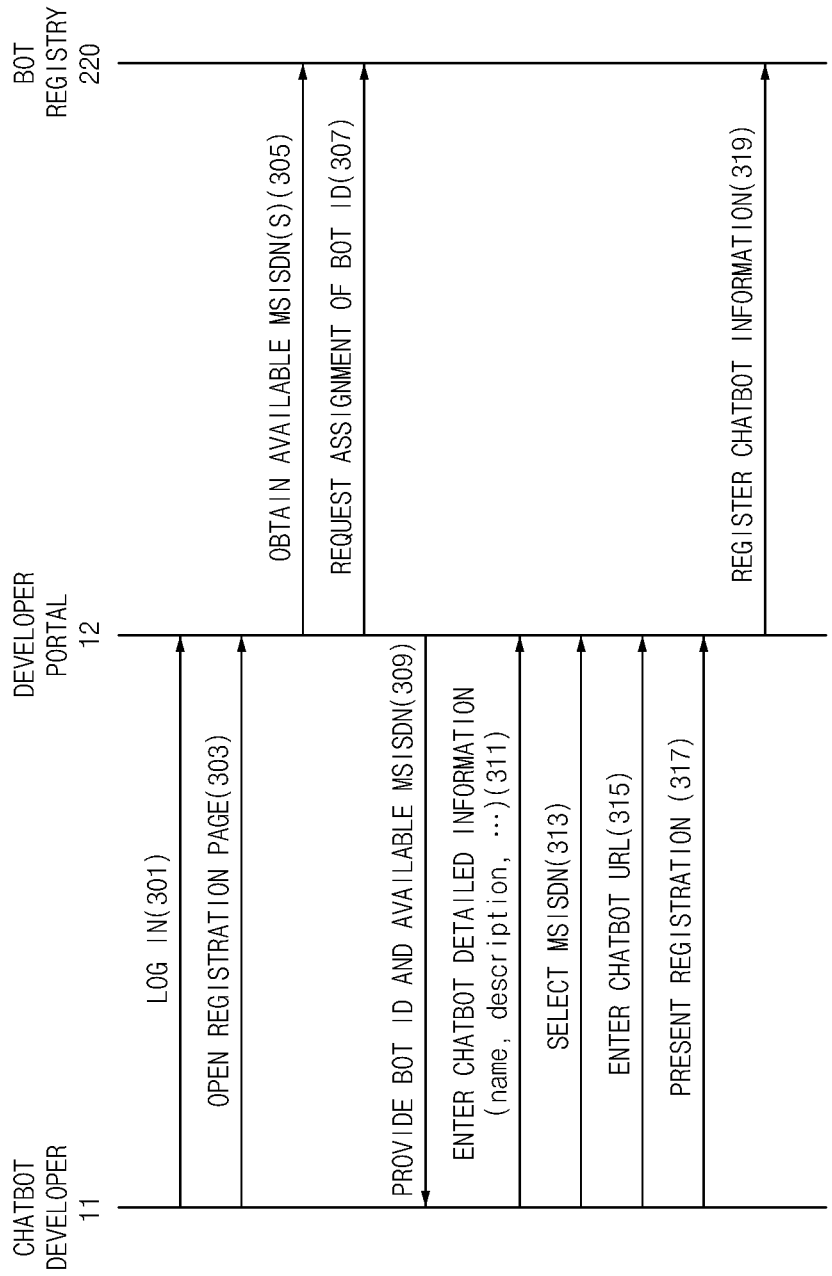
FIG. 3 is a flowchart of a method of registering a chatbot in a bot registry, according to an embodiment.

FIG. 3 is a flowchart of a method of registering a chatbot in a bot registry, according to an embodiment.

Referring to FIG. 3, the chatbot developer 11 may register a chatbot in the developer portal 12. For example, the developer portal 12 may be a web portal of a bot platform 200. In this case, a bot registry (e.g., bot registry 220 of FIG. 1A) may store chatbot information. The bot registry 220 may provide the chatbot developer 11 with an available RCS identifier or may assign the unique identifier of the chatbot, for example, a bot identifier (ID) to the chatbot developer 11. The unique identifier according to an embodiment may be the bot identifier assigned from the bot registry 220.

According to an embodiment, the RCS identifier may be a phone number associated with the chatbot, for example, MSISDN. In the case where a dialog content providing service is provided through RCS infra, when the URL (or URI) including a phone number is used, a user may access the chatbots by using the telephone number like the method of the conventional chat. From the user's point of view, it may be effective to use the telephone numbers of chatbots, because like the conventional method, the user registers at least one or more chatbots in a phone book or makes a call or sends a short message service (SMS) message during a conversation.

Hereinafter, a method of assigning a phone number to a chatbot and registering the chatbot in the bot registry 220 will be described.

In operation 301, the chatbot developer 11 may log in the developer portal 12; in operation 303, the chatbot developer 11 may open the registration page of developer portal 12. In operation 305, the developer portal 12 may obtain available phone number(s) from the bot registry 220; in operation 307, the developer portal 12 may request the bot registry 220 to assign a bot ID. The phone number provide and bot ID provided by the registry 220 can be used by an electronic device 100 to access the chatbot through the platform server 200.

In operation 309, the developer portal 12 may provide the chatbot developer 11 with the obtained bot ID and the available phone number. In operation 311, the chatbot developer 11 may enter chatbot detailed information into the developer portal 12. In an embodiment, the chatbot detailed information may include the name of the chatbot, feature information of the chatbot, or the like.

In operation 313, the chatbot developer 11 may select a phone number to be used among the available phone number (s) provided by the developer portal 12. The phone number selected by the chatbot developer 11 may be an identifier usable as a phone number of the chatbot from the user's point of view.

Alternatively, the bot registry 220 may assign the phone number of the chatbot. The bot registry 220 may assign the phone number of the chatbot and may transmit the assigned phone number to the developer portal 12. In this case, in operation 305, the developer portal 12 may obtain the phone number assigned to the chatbot from the bot registry 220.

In operation 315, the chatbot developer 11 may enter a location identifier associated with the chatbot into the developer portal 12. For example, the chatbot developer 11 may register chatbot URL (or URI) in the developer portal 12. The location identifier of the chatbot according to an embodiment may be used to transmit a request of the user to the chatbot (e.g., the chatbot 300 of FIG. 1A) and to find the unique identifier of the chatbot, or the like, in a platform server (e.g., the platform server 200 of FIG. 1A) or a bot service (e.g., the bot service 230 of FIG. 1A).

In operation 317, the chatbot developer 11 may register the chatbot in the developer portal 12; in operation 319, the developer portal 12 may register chatbot information in the bot registry 220. In the case where the user searches for the chatbot or in the case where the user selects and subscribes the chatbot, the chatbot information registered in the bot registry 220 may be used by the electronic device 100 or may be used to utilize information internally by a server.

Figure 4:
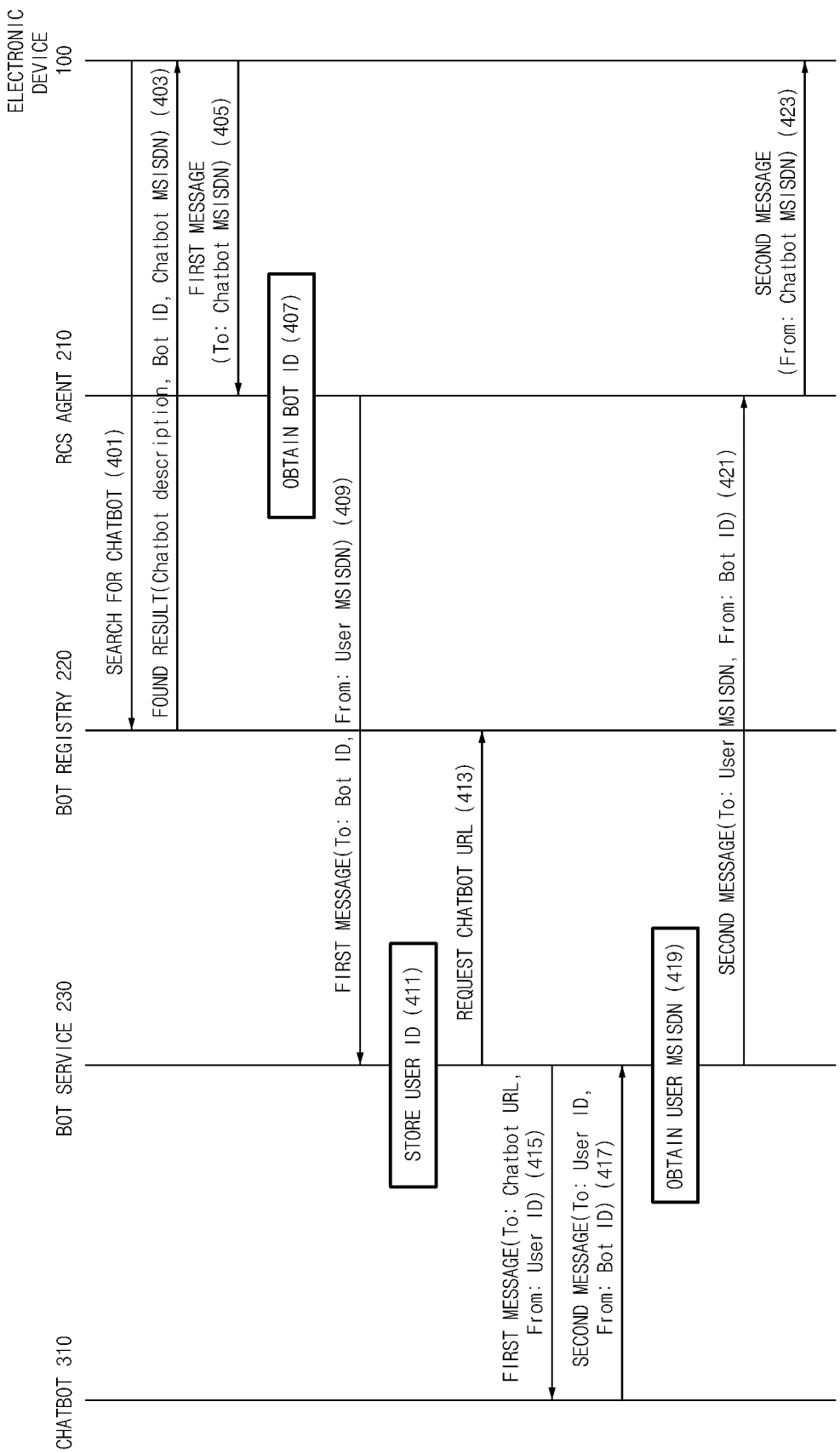
FIG. 4 is a flowchart of a method in which an electronic device and a chatbot transmits and/or receives a message through a platform server, according to an embodiment.

FIG. 4 is a flowchart of a method in which an electronic device and a chatbot transmits and/or receives a message through a platform server, according to an embodiment.

According to an embodiment, the chatbot (e.g., the chatbot 300 of FIG. 1A) may have an independent phone number that is not shared with another chatbot, and a user may identify a chatbot by using the phone number. In the following description of FIG. 4, the RCS identifier of the chatbot may be chatbot MSISDN, the unique identifier of the chatbot may be a bot ID, and the location identifier of the chatbot may be a chatbot URL. In the following description of FIG. 7, the RCS identifier of the user (or an electronic device) may be user MSISDN, and the unique identifier of the user (or an electronic device) may be a user ID.

A platform server (e.g., the platform server 200) according to an embodiment may include the RCS agent 210, the bot registry 220, and/or the bot service 230.

Hereinafter, the message that the electronic device 100 transmits to the chatbot may be referred to as a "first message", and the message, which the chatbot transmits to the electronic device 100, as a response to the first message may be referred to as a "second message". According to an embodiment, the first message may be a connection request or a message for the user to transmit a first chat to the chatbot. The second message may be a connection response associated with the connection request or a second chat that is a response of the chatbot associated with the first chat. The first message or the second message may include various types of content. For example, the first message or the second message may include a text, a voice, a video, an image, or the like.

Referring to FIG. 4, in operation 401, the electronic device 100 may search for a chatbot in the bot registry 220. For example, when the user enters a search word for searching for a chatbot into the electronic device 100, the electronic device 100 may search for a chatbot associated with the search word in the bot registry 220. In certain embodiments, operation 401 can be transmission of a message formatted according to Tables 1 and 2.

In operation 403, the bot registry 220 may transmit the found result to the electronic device 100. The electronic device 100 may output the found result to a display (e.g., the input/output device 102). For example, the found result may include at least one of chatbot feature information (e.g., description), a bot ID, or chatbot MSISDN. In certain embodiments, operation 403 can be transmission of a message formatted according to Tables 3 and 4.

According to an embodiment, the electronic device 100 may designate a chatbot. The electronic device 100 may designate the chatbot 310 (e.g., first chatbot 310 of FIG. 1A) among chatbots registered in the bot registry 220.

According to an embodiment, when the chatbot 310 is designated, the electronic device 100 may send a subscribe request and may initiate a session (e.g., generation of a chatroom or the like) for transmitting and/or receiving a message to and/or from the chatbot 310, after the subscribe request is accepted by the chatbot 310. According to various embodiments, the electronic device 100 may make a request for user authentication to the user to transmit the subscribe request. Furthermore, in the case where the user does not desire to communicate with the chatbot 310, the user may transmit an unsubscribe request to the corresponding chatbot 310.

According to an embodiment, the electronic device 100 may provide the user with at least one chatbot through a user interface and may obtain user selection associated with the target chatbot 310 of at least one chatbot through the user interface.

The user interface may be a visual user interface and/or a voice-based user interface. For example, the electronic device 100 may obtain a voice input of the user and may output a response associated with the voice input in the form of a voice. The user interface may be a part of the message application.

In operation 405, the electronic device 100 may transmit the first message to the RCS agent 210. The electronic device 100 may obtain a user input associated with the chatbot 310 and may transmit the first message in response to the user input. The first message may include a connection request to the chatbot 310 or a chat, for example, a chat such as "Hello". The first message according to an embodiment may be a part of an RCS message.

According to an embodiment, the first message may include destination information such that the RCS agent 210 knows the destination of the first message. For example, the first message may include the chatbot MSISDN associated with the chatbot 310. The first message may further include source information. For example, the source may include the user MSISDN associated with the user or the electronic device 100.

In operation 407, the RCS agent 210 may obtain the bot ID based on the MSISDN of the chatbot 310. The RCS agent 210 may obtain the bot ID mapped to the chatbot 310. For example, the RCS agent 210 may obtain the bot ID from the bot registry 220.

In operation 409, the RCS agent 210 may transmit the first message to the bot service 230. The RCS agent 210 may transmit the first message to the bot service 230 based on the obtained bot ID. According to an embodiment, the first message may include destination information converted through the RCS agent 210. For example, the converted destination information may include the bot ID obtained in operation 407. The first message may include source information. The source information may be the user MSISDN assigned to the user of the electronic device 100.

In operation 411, the bot service 230 may store a user ID. The bot service 230 may convert the form of the user MSISDN into the form capable of being identified by the chatbot. The bot service 230 may obtain the user ID based on the user MSISDN or may obtain the user ID from the electronic device 100 and may store the user ID. According to an embodiment, the user ID may be arbitrarily generated by the bot service 230, may be obtained from the electronic device 100, or may be obtained from the bot registry 220. For example, the user ID may be generated based on the user phone number.

In operation 413, the bot service 230 may obtain the chatbot URL being the location identifier of the chatbot 310. For example, the bot service 230 may make a request for chatbot URL (or URI) to the bot registry 220 and may obtain the chatbot URL from the bot registry 220. According to an embodiment, the chatbot URL may be mapped to the bot ID. The bot registry 220 may store the relationship between the chatbot URL and the bot ID.

In operation 415, the bot service 230 may transmit the first message to the chatbot 310 by using the obtained chatbot URL. The first message may include the chatbot URL as destination information and may include a user ID as source information. According to an embodiment, the first message may be a part of a HTTP message. In certain embodiments, the operation 415 can include transmitting a message formatted as shown in Tables 7 and 8.

According to an embodiment, the chatbot 310 may transmit the second message to the source (e.g., the electronic device 100) of the first message in response to the first message. In operation 417, the chatbot 310 may transmit the second message to the bot service 230 in response to the first message.

The second message may include destination information and source information of the second message. For example, the destination information may include a user ID. For example, the source information may include a bot ID. In certain embodiments, the second message may be formatted as shown in Tables 9, 10, and 11.

In operation 419, the bot service 230 may obtain user MSISDN. The bot service 230 may obtain user MSISDN based on the user ID.

In operation 421, the bot service 230 may transmit the second message to the RCS agent 210. The destination information included in the second message may be the user MSISDN, and the source information may be the bot ID.

In operation 423, the RCS agent 210 may transmit the second message to the electronic device 100. The second message may include the user MSISDN.

In each operation, information between the electronic device 100 and the RCS agent 210 may be transmitted and/or received through an RCS network (e.g., the RCS network 10). The message between the electronic device 100 and the RCS agent 210 may be an RCS message. For example, the information between the electronic device 100 and the bot registry 220 may be transmitted and/or received in the format of a HTTP message.

In the bot service 230 and/or the RCS agent 210, the format of a message may be converted such that the message is capable of being transmitted and/or received to and/or from the electronic device 100 or the chatbot 310. For example, the message obtained from the electronic device 100 by the RCS agent 210 may be converted to the message of a HTTP format by the bot service 230. The message obtained from the chatbot 310 by the bot service 230 may be converted from the message of a HTTP format to the message of an RCS format by the bot service 230. The message exchange between the bot service 230 and the RCS agent 210 may be performed depending on the internal protocol of a platform server.

In the case where a chatbot is identified by using a phone number, there are restrictions on issuing the phone number in real time as well as the cost of issuing the telephone number, due to the characteristic of the telephone number. For the platform's competitiveness, various developers need to easily create or distribute chatbots. Hereinafter, with reference to FIGS. 5 and 6, for the purpose of reducing the cost of issuing the phone number and increasing chatbot registration, a method in which a phone number-based platform server (e.g., the platform server 200 of FIG. 1A) may assign one phone number to a plurality of chatbots, and an electronic device (e.g., the electronic device 100 of FIG. 1A) identifies a chatbot by using one phone number is suggested.

Figure 5:
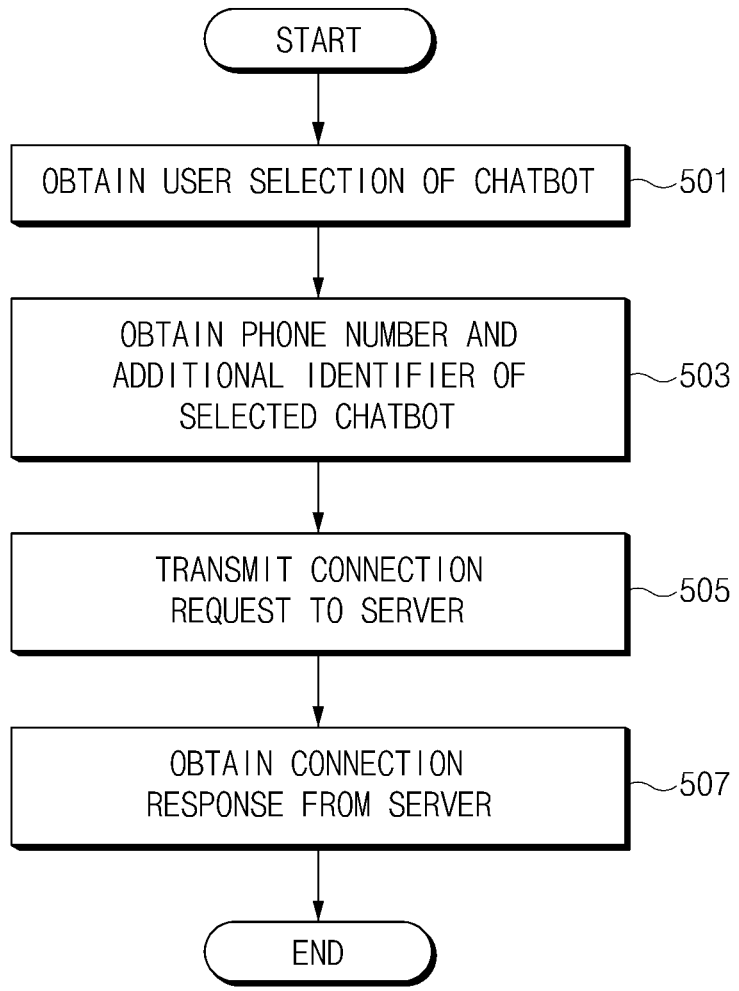
FIG. 5 is a flowchart of a method in which an electronic device transmits and/or receives a message to and/or from chatbot through a platform server, according to an embodiment.
Figure 6:
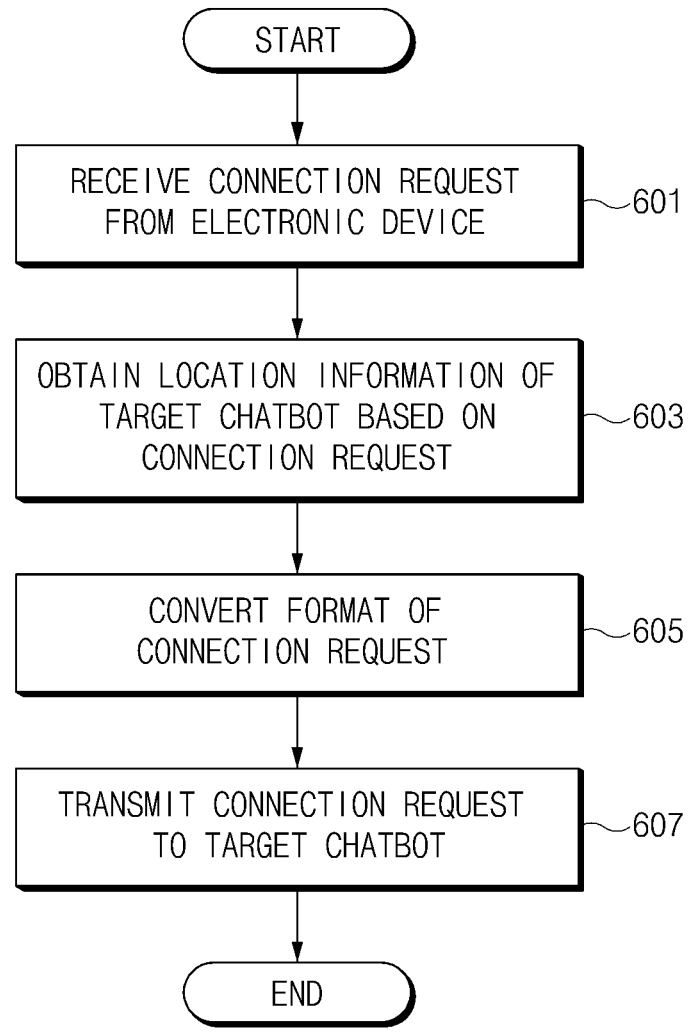
FIG. 6 is a flowchart of a method in which a platform server connects an electronic device to a chatbot, according to an embodiment.

In descriptions about FIGS. 5 and 6, one embodiment is described assuming that the first message described in FIG. 4 is a connection request and the second message is a connection response. However, embodiments in FIGS. 5 and 6 may be also applied to the case where the first message and the second message is a chat including content.

FIG. 5 is a flowchart of a method in which an electronic device transmits and/or receives a message to and/or from chatbot through a platform server, according to an embodiment.

Referring to FIG. 5, an electronic device (e.g., the electronic device 100 or at least one processor 104 of FIG. 2) may communicate with a chatbot (e.g., chatbot 310, 320 or 330 of FIG. 1A) by using an additional identifier in addition to a phone number. In the following embodiment, a plurality of chatbots may share one phone number, and different additional identifiers may be assigned to the plurality of chatbots. The electronic device may transmit the additional identifier together with a phone number during a connection request.

In operation 501, the electronic device 100 (e.g., the processor 102 or input/output device 106) may obtain the selection of a chatbot (e.g., first chatbot 310) of a user. The user may select at least one target chatbot among a plurality of chatbots (e.g., the chatbot 300 of FIG. 1A) through an input device.

In operation 503, the electronic device 100 (e.g., the processor 102, memory 106 or communication circuit 108) may obtain the phone number and the additional identifier of the selected target chatbot. According to an embodiment, the electronic device may have the phone number and/or the additional identifier of the target chatbot in advance (e.g., from the memory 106) or may obtain the phone number and/or the additional identifier by searching for a bot registry (e.g., the bot registry 220 of FIG. 1A) via a communication circuit 108. For example, the additional identifier may be the bot ID or the extension of the phone number.

In operation 505, the electronic device (e.g., the processor 104) may transmit the connection request to a platform server 200. The connection request according to an embodiment may include at least destination information. The destination information may include the phone number and the additional identifier of the target chatbot. According to an embodiment, the connection request may further include source information. The source information may be the phone number of the electronic device (or user).

In operation 507, the electronic device (e.g., the processor 104) may obtain the connection response from the platform server 200. The connection response may include the source information. The source information may include the phone number and the additional identifier of the target chatbot. The connection response may further include the destination information. The destination information may be the phone number of the electronic device (or user).

FIG. 6 is a flowchart of a method in which a platform server connects an electronic device to a chatbot, according to an embodiment.

Referring to FIG. 6, a platform server (e.g., the platform server 200 or the processor 202 of FIG. 2) may identify a chatbot 302, 304, 306 by using an additional identifier in addition to a phone number. The platform server 200 may further obtain an additional identifier from an electronic device.

In operation 601, the platform server (e.g., the at least one processor 202) may receive a connection request from an electronic device (e.g., the electronic device 100 of FIG. 1A). According to an embodiment, the connection request may include the phone number and the additional identifier of a target chatbot targeted by the electronic device. For example, the additional identifier may be a bot ID or extension. According to an embodiment, the phone number may be the number that a plurality of chatbots share.

In operation 603, the platform server (e.g., the at least one processor 202) may obtain the location information of the target chatbot based on the connection request. The platform server may obtain the location information of the target chatbot by using the phone number and the additional identifier. For example, the location information may include the location identifier (e.g., URL) of the target chatbot. According to an embodiment, the location information may be determined based on at least one of the phone number and additional identifier of the target chatbot. In operation 603, an operation of obtaining the location information of the target chatbot may include an operation of identifying the target chatbot. In certain embodiments, operation 603 can be performed by the BOT registry 220.

In operation 605, the platform server (e.g., the at least one processor 202) may convert the format of the connection request. According to an embodiment, the platform server may convert the connection request from an RCS-based message to a HTTP-based message. In certain embodiments, this operation 605 can be performed by the BOT service 230. In operation 605, the platform server may change the destination of the connection request from the RCS identifier of the target chatbot to a unique identifier. For example, the platform server may convert a chatbot phone number to a chatbot ID. For the purpose of transmitting the connection request to the chatbot, the platform server may obtain the location information of the target chatbot based on the unique identifier. The platform server may change the source of the connection request from the RCS identifier of an electronic device to a unique identifier. For example, the platform server may convert a user phone number to a user ID.

In operation 607, the platform server (e.g., the at least one processor 202) may transmit the connection request to the target chatbot. According to an embodiment, the connection request may converted to a HTTP-based message format. The connection request may include the location information of the target chatbot. According to an embodiment, the connection request may include the user ID as source information. In certain embodiments, operation 607 may be performed by he BOT service 230.

According to various embodiments, the platform server may obtain the connection response from the target chatbot as the response to the connection request and may transmit the connection response to the electronic device.

Figure 7:
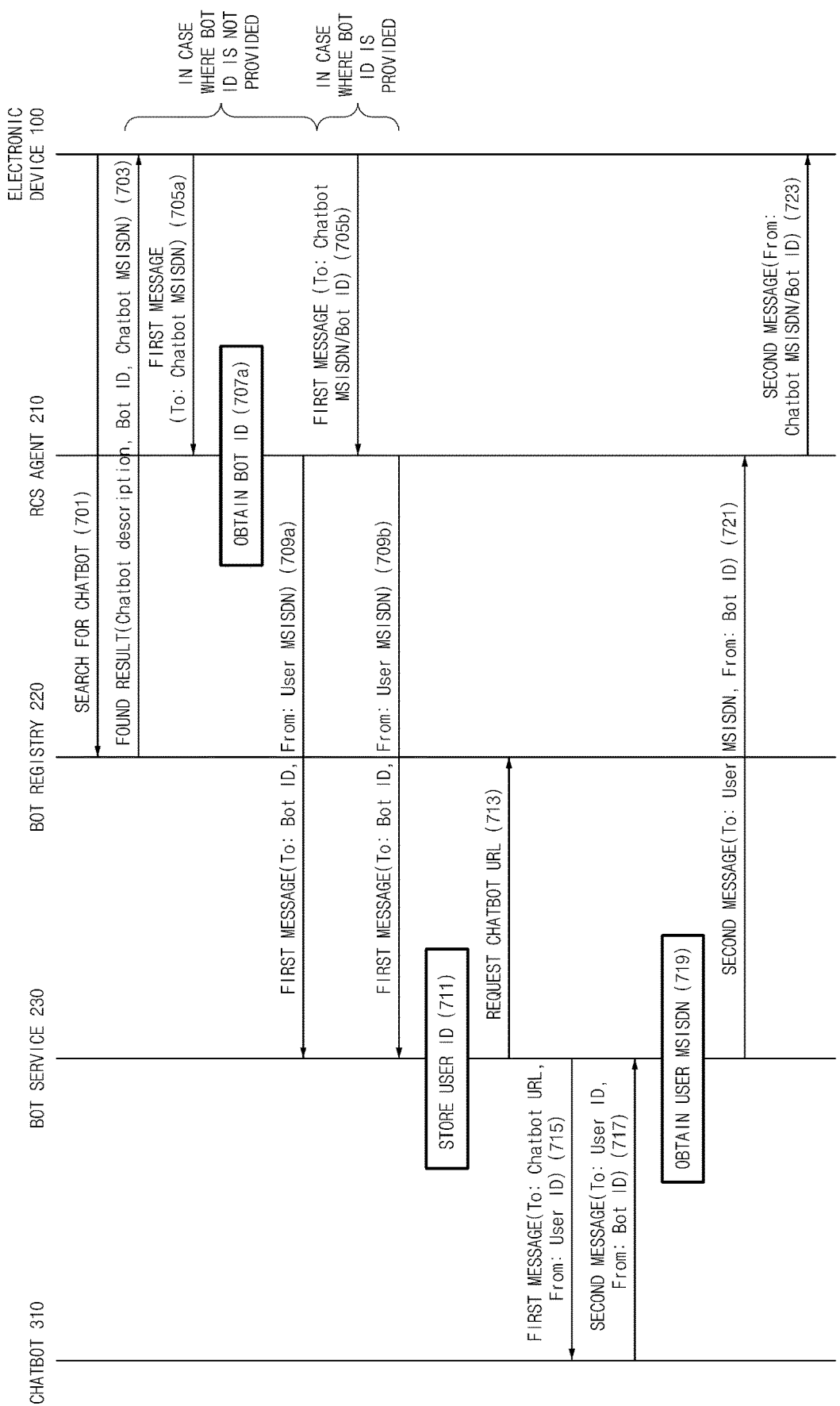
FIG. 7 is a flowchart of a method in which an electronic device and a chatbot transmits and/or receives a message through a platform server, according to an embodiment.

FIG. 7 is a flowchart of a method in which an electronic device and a chatbot transmits and/or receives a message through a platform server, according to an embodiment.

A platform server (e.g., the platform server 200) according to an embodiment may include the RCS agent 210, the bot registry 220, and/or the bot service 230.

Referring to FIG. 7, the electronic device 100 (e.g., the electronic device 100 or processor 102 of FIG. 2) and a chatbot (e.g., the chatbot 300 of FIG. 1A) may verify the existence of each other by using a phone number and a bot ID. According to an embodiment, the chatbot 300 may share the same phone number with another chatbot. For distinction between chatbots using the same phone number, a bot ID may be used as an additional identifier. In the following description of FIG. 7, the RCS identifier of the chatbot may be chatbot MSISDN, the unique identifier of the chatbot may be a bot ID, and a bot ID may be used as the additional identifier. The location identifier of the chatbot may be a chatbot URL. In the following description of FIG. 7, the RCS identifier of the user (or an electronic device) may be user MSISDN, and the unique identifier of the user (or an electronic device) may be a user ID.

In operation 701, the electronic device 100 may search for a chatbot in the bot registry 220. In certain embodiments, operation 701 can be transmission of a message formatted according to Tables 1 and 2. Since operation 701 is the same as or similar to operation 401 of FIG. 4, a detailed description thereof is thus omitted.

In operation 703, the bot registry 220 may transmit the found result to the electronic device 100. In certain embodiments, operation 403 can be transmission of a message formatted according to Tables 3 and 4. Operation 703 may be the same as or similar to operation 403 of FIG. 4.

Referring to FIG. 7, in the case where a bot ID is not provided, the electronic device 100 may perform operation 705a, operation 707a, and operation 709a for the purpose of transmitting a first message.

In operation 705a, the electronic device 100 may transmit the first message to the RCS agent 210. In the case where the bot ID is not provided, the electronic device 100 may transmit only the phone number of the chatbot 310 to the RCS agent 210. Operation 705a may be the same as or similar to operation 405 of FIG. 4.

In operation 707a, the RCS agent 210 may obtain the bot ID based on the phone number of the chatbot 310. Operation 707a may be the same as or similar to operation 407 of FIG. 4.

In operation 709a, the RCS agent 210 may transmit the first message to the bot service 230. Operation 709a may be the same as or similar to operation 409 of FIG. 4.

In the case where the bot ID is provided, the electronic device 100 may perform operation 705b and operation 709b for the purpose of transmitting the first message. For the purpose of distinguishing operation 705a to operation 709a from operation 705b and operation 709b, the electronic device 100 may determine whether the bot ID of the chatbot is provided.

In operation 705b, the electronic device 100 may transmit the bot ID of the chatbot 310 together with a phone number of the chatbot 310. In operation 705b, while transmitting the first message to the RCS agent 210, the electronic device 100 may include destination information and source information in the first message. The destination information may include the phone number and the bot ID of the chatbot 310. The source information may include the phone number of the electronic device 100.

Since the RCS agent 210 has received the bot ID from the electronic device 100, in operation 709b, the RCS agent 210 may transmit the first message to the bot service 230. The RCS agent 210 may use the bot ID obtained from the electronic device 100 instead of obtaining the bot ID from the bot registry 220. The destination of the first message transmitted to the bot service 230 may be the bot ID, and the source may be a user phone number.

In operation 711, the bot service 230 may store a user ID. Operation 711 may be the same as or similar to operation 411 of FIG. 4.

In operation 713, the bot service 230 may obtain chatbot URL. Operation 713 may be the same as or similar to operation 413 of FIG. 4.

In operation 715, the bot service 230 may transmit the first message to the chatbot URL. In certain embodiments, operation 715 can include transmission of a message formatted as shown in Tables 7 and 8. Operation 715 may be the same as or similar to operation 415 of FIG. 4.

According to an embodiment, the chatbot 310 may transmit a second message to the electronic device 100 in response to the first message. In operation 717, the chatbot 310 may transmit a second message to the BOT service 230 in response to the first message. In certain embodiments, operation 717 can include transmission of a message formatted as shown in Tables 9, 10, and 11. Operation 717 may be the same as or similar to operation 417 of FIG. 4.

In operation 719, the bot service 230 may obtain user MSISDN. Operation 719 of FIG. 7 may be the same as or similar to operation 419 of FIG. 4.

In operation 721, the bot service 230 may transmit the second message to the RCS agent 210. The destination of the second message may be the user MSISDN, and the source may be the bot ID. Operation 721 may be the same as or similar to operation 421 of FIG. 4.

In operation 723, the RCS agent 210 may transmit the second message to the electronic device 100. The RCS agent 210 may include chatbot MSISDN and the bot ID in the source information. The electronic device 100 may identify the source of the second message based on the chatbot MSISDN and the bot ID. According to various embodiments, the electronic device 100 may display the second message in a chatroom corresponding to the source of the second message.

At least part of operations illustrated in FIG. 7 may be variously changed according to various embodiments of the present disclosure. For example, transmission of the bot ID in operation 705b may be performed independently of the transmission of the connection request. The connection request may include only the chatbot MSISDN as destination information.

Figure 8:
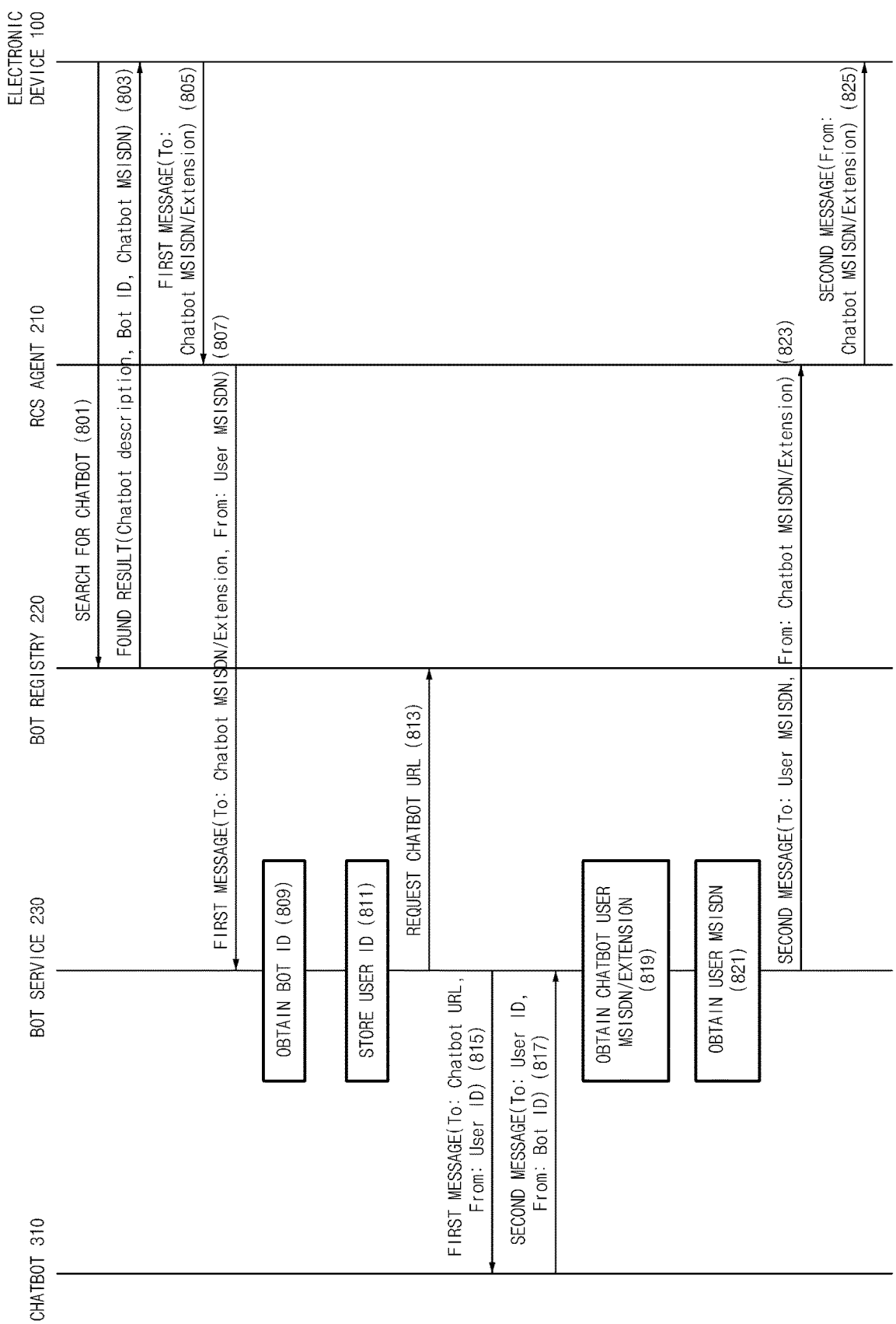
FIG. 8 is a flowchart of a method in which an electronic device and a chatbot transmits and/or receives a message through a platform server, according to an embodiment.

FIG. 8 is a flowchart of a method in which an electronic device and a chatbot transmits and/or receives a message through a platform server, according to an embodiment.

Referring to FIG. 8, the electronic device 100 (e.g., the electronic device 100 or processor 102 of FIG. 2) and a chatbot (e.g., the chatbot 310 of FIG. 1A) may verify the existence of each other by using at least phone number extension. According to an embodiment, the chatbot may share the same phone number with another chatbot. The extension of a phone number as well as a phone number may be used for distinction between chatbots. In the case where the electronic device 100 transmits a message, the electronic device 100 may transmit the extension together and the bot service 230 may identify a bot ID based on the extension. The extension may be an additional identifier of the chatbot.

A platform server (e.g., the platform server 200) according to an embodiment may include the RCS agent 210, the bot registry 220, and/or the bot service 230.

In the following description of FIG. 8, the RCS identifier of the chatbot may be chatbot MSISDN, the unique identifier of the chatbot may be a bot ID, and the location identifier of the chatbot may be a chatbot URL. In the following description of FIG. 8, the RCS identifier of the user (or an electronic device) may be user MSISDN, and the unique identifier of the user (or an electronic device) may be a user ID.

In operation 801, the electronic device 100 may search for a chatbot in the bot registry 220. In certain embodiments, operation 801 can include transmitting a message formatted as shown in Tables 1 and 2. Since operation 801 is the same as or similar to operation 401 of FIG. 4, a detailed description thereof is thus omitted.

In operation 803, the bot registry 220 may transmit the found result to the electronic device 100. In certain embodiments, operation 803 can include transmitting a message formatted as shown in Tables 3 and 4. Operation 803 may be the same as or similar to operation 403 of FIG. 4.

Referring to FIG. 8, in operation 805, the electronic device 100 may transmit the chatbot MSISDN and the extension of the chatbot 310 together, when transmitting a first message. For example, the destination information of the connection request may include the chatbot MSISDN and the extension of the chatbot 310, and the source information may include user MSISDN.

In operation 807, the RCS agent 210 (e.g., the RCS agent 210 of FIG. 1A) may transmit the first message to the bot service 230 (e.g., the bot service 230 of FIG. 1A). For example, when transmitting the first message, the RCS agent 210 may set the destination of the first message to the chatbot MSISDN and the extension, and may set the source to user MSISDN.

In operation 809, the bot service 230 may obtain a bot ID. For example, the bot service 230 may obtain the bot ID based on at least the extension.

In operation 811, the bot service 230 may store a user ID. The bot service 230 may obtain the user ID based on the user MSISDN. According to an embodiment, when storing the user ID, the bot service 230 may map the user ID to the phone number. In the case where the bot service 230 receives a second message as a response to the first message, the bot service 230 may use the user ID stored to obtain the user MSISDN. The user ID may be used for the purpose of protecting the privacy of the user. When using the user ID, even though the bot service 230 does not notify the chatbot 310 of the user MSISDN, it is possible to exchange information between the user and the chatbot 310.

In operation 813, the bot service 230 may make a request for the chatbot URL of the chatbot 310 to the bot registry 220, and may obtain the chatbot URL from the bot registry 220. Operation 813 may be the same as or similar to operation 413 of FIG. 4.

In operation 815, the bot service 230 may transmit the first message to the chatbot 310; in operation 817, the bot service 230 may obtain the second message as a response to the first message. According to an embodiment, the source of the second message may be the chatbot 310, and the destination thereof may be the electronic device 100. The second message may include the bot ID as the source and may include the user ID as the destination. Operation 815 may be the same as or similar to operation 415 of FIG. 4, and operation 817 may be the same as or similar to operation 417 of FIG. 4.

In operation 819, the bot service 230 may obtain a pair of the chatbot MSISDN and the extension of the chatbot 310, based on the user ID included in the second message. According to an embodiment, the bot ID may be mapped to the pair of the chatbot MSISDN and the extension.

In operation 821, the bot service 230 may obtain user MSISDN. According to an embodiment, the bot service 230 may obtain the second message from the chatbot 300 and may obtain the user MSISDN based on the user ID included in the second message. The bot service 230 may convert the destination of the second message into the user MSISDN and may convert the source of the second message to the chatbot MSISDN and the extension.

In operation 823, the bot service 230 may transmit the second message to the RCS agent 210. When transmitting the second message, the bot service 230 may include the user MSISDN instead of the user ID as the destination information in the second message. When transmitting the second message, the bot service 230 may include the chatbot MSISDN and the extension instead of the bot ID as the source of the second message.

In operation 825, the RCS agent 210 may transmit the second message to the electronic device 100. The destination of the second message may be the user MSISDN. The electronic device 100 may verify that the second message is associated with the electronic device 100, based on the user MSISDN. The RCS agent 210 may include the chatbot MSISDN and the extension as the source information in the second message. The electronic device 100 may determine the chatroom for displaying the second message, based on the source information of the second message.

As described above, when the chatbot phone number is shared with a plurality of chatbots (e.g., the chatbot 310 and the chatbot 320 of FIG. 1A) and the phone number is displayed in a user interface, it is difficult for the user to distinguish the phone number of the chatbots. Moreover, when the user selects one chatbot phone number, an electronic device (e.g., the electronic device 100 of FIG. 1A) and a platform server (e.g., the platform server 200, the RCS agent 210, or the bot service 230 of FIG. 1A) may not determine which chatbot is the message from the user associated with?

According to an embodiment, the electronic device 100 may display the chatbot phone number and the extension associated with the chatbot in a user interface. According to an embodiment, the electronic device 100 may display the extension associated with the chatbot after the chatbot phone number.

When displaying the extension, the electronic device 100 may display symbol "PAUSE" or symbol "WAIT" in the phone number. According to an embodiment, the electronic device 100 may display the chatbot phone number by using character "p" or "w" or symbol "," or ";". For example, in the case where the phone number of the first chatbot (e.g., the first chatbot 310 of FIG. 1A) is set to "821234567" and the extension set to "12345", the phone number of the first chatbot such as "+821234567p 12345", "+821234567w 12345", "+821234567, 12345", or "+821234567; 12345" may be displayed in the user interface.

That the electronic device 100 displays the extension may mean that when a call is connected, the electronic device 100 transmits the extension after the corresponding symbols (e.g., p, w, or the like) with dual tone multi frequency (DTMF) such that a separate extension is capable of being connected. In this case, the user may naturally connect the call to the person in charge, while talking with the chatbot.

Hereinafter, a method of transmitting an additional identifier in addition to a phone number will be described. According to an embodiment, the additional identifier may be at least one of a unique identifier (e.g., bot ID) or the extension of a phone number. Hereinafter, a method in which an electronic device (e.g., the electronic device 100 of FIG. 1A or the electronic device 100 of FIG. 2) transmits the additional identifier will be described based on the case where the additional identifier is the bot ID.

According to an embodiment, an electronic device may include bot ID information in an RCS message. According to an embodiment, the RCS message format may include a header, and the bot ID information may be included in the header.

The bot ID information according to an embodiment may be included in a session initiation protocol (SIP) message. For example, the bot ID information may be included in a SIP header. Returning to FIG. 7, in operation 705b, a connection request may be the SIP message, and the bot ID information may be included in the header of the SIP message.

The SIP header may be used when a chat session is generated; after the chat session is established, messages may be transmitted and/or received within a session established without the help of the SIP message. Accordingly, in the case where an electronic device transmits an identifier by using a SIP header when talking with a plurality of chatbots having the same phone number, an electronic device needs to use a separate session for the purpose of talking with each chatbot.

According to an embodiment, while one electronic device talks with chatbots sharing the same phone number with each other in different chat threads, one electronic device may exchange a chat with a plurality of chatbots by using one chat session. According to an embodiment, the electronic device may include bot ID information in a common profile for instant messaging (CPIM) message. For example, the bot ID information may be included in the CPIM header. When using the CPIM header, the electronic device may transmit a message by using the bot ID after a session is connected. Accordingly, when talking with chatbots having the same phone number, the electronic device may use one session. However, in the case where one user is invited in a group chat, the bot ID information may be included in a SIP header of a REFER message or the like.

When the session is connected, the electronic device may transmit a message (or chat) wrapped with CPIM by using a message session relay protocol (MSRP). Herein, the electronic device may transmit the receiving-side bot ID using an additional parameter.

According to an embodiment, the RCS message may include payload, and the bot ID information may be included in the payload of the message. Alternatively, the bot ID information may be transmitted before the payload is transmitted, and the destination of the payload may be specified.

According to an embodiment, chat parties, for example, the chatbot and the electronic device may be divided into two types depending on whether the source and destination includes the additional identifier. One may be a first type in which the source and destination does not include the additional identifier, and the other may be a second type in which the source and destination includes the additional identifier. The first type may include a chatbot or an electronic device, and the second type may include a chatbot.

For example, the additional identifier may be the extension. In the following description, the additional identifier may be the extension.

In the case where the first type and the second type coexist in a plurality of sources and destinations, when the extension is used in addition to a phone number, there are a variety of scenarios between an electronic device and a chatbot or between a chatbot and another chatbot.

(a) Chat between first types
(b) 1:1 Chat between the first type and the second type
(c) 1:1 Chat between second types ((1) in the case where phone numbers are different from each other, (2) in the case where phone numbers are the same as each other)
(d) Group chat in which only the first type participates
(e) Group chat in which only the second type participates ((1) in the case where all phone numbers of the second types are different from each other, (2) in the case where there are two or more participants, each of which has the same phone number, in the second types)

Various embodiments of the present disclosure may be identically applied to the variety of scenarios or may be applied to the variety of scenarios after being changed.

In the case of (a), when a chat between the first type devices is performed, an independent chat session is established between the first type devices, and the independent chat thread may be opened. The source and destination information may be included in the SIP header or the CPIM header.

In the case of (b), the source and destination (e.g., an electronic device or a chatbot) of one first type may do 1:1 chat with a plurality of second type sources and destinations (e.g., chatbot) different from each other. In the case of a 1:1 chat, a platform server or an electronic device may not generate a plurality of chat sessions for each of second type chatbots and may share the chat session with each other. For example, in the case where the second type chatbots use the same phone number, the platform server may make it possible to share one chat session.

According to an embodiment, in the case where the electronic device chats with each of the plurality of second type chatbots, the electronic device may include extension information in the CPIM header upon transmitting a message. Alternatively, when the electronic device receives a message, the extension information may be included in a CPIM header. Since a chat may be transmitted and/or received within a session established without the help of the SIP message after the chat session is established, the electronic device may use the CPIM header without using the SIP header when transmitting the extension information.

In the case of (1) (in the case where phone numbers between second types are different from each other during a chat between second types) of (c), source and destination information may be included in the SIP header or the CPIM header. Since different phone numbers are used, an independent chat session may be established between second type devices, and the independent chat thread may be opened.

According to an embodiment, a chat between second types may be a chat between chatbots. In this case, chatbots may exchange a chat through an RCS network. Alternatively, a chat between chatbots may be routed within a server without passing through the RCS network.

In the case of (2) (in the case where phone numbers between second types are the same as each other, during a chat between second types) of (c), a dialog content providing system may operate as follows.

According to an embodiment, in the case where the phone numbers between second types are the same as each other, the same chat session may be shared. At this time, a chat may be performed through different chat threads among second types. In this case, the phone number may be included in the SIP header, and the extension may be included in the CPIM header for a distinction between second types.

According to an embodiment, a chat between second types may be a chat between chatbots. In this case, chatbots may exchange a chat through the RCS network. Alternatively, a chat between chatbots may be routed within a server without passing through the RCS network.

In the case of (d), since only the first type participates, participants may include different phone numbers, respectively. In this case, a separate chat session may be opened with respect to each of the participants.

In the case of (1) of (e), one chat thread may be established between second types having different phone numbers, and a separate chat session may be established with respect to each of the participants.

In the case of (2) of (e) (in the case where there are two or more participants, which have the same phone number, in second types, during a group chat in which the second type participates), a separate chat session may be established or a chat session may be shared. From the perspective of a conference focus hosting group chat, the conference focus may establish a separate chat session (hereinafter referred to as a "one-to-one chat session") with a second type destination having the same phone number, or may establish one chat session (hereinafter referred to as a many-to-one chat session) with all the second type destinations having the same phone number. In the case of a many-to-one chat session, a chat may be transmitted to the chatbots corresponding to each extension by the platform server that is the destination side.

In a many-to-one chat session, after a chat session between conference focus and an electronic device is connected, the source and destination may be distinguishable between the conference focus and the electronic device without the help of the SIP message. Accordingly, the electronic device or the server may transmit the extension by using the CPIM header.

In the RCS standard, an event of Disposition and IsComposing may be defined. In the case of Disposition event, it is defined that the electronic device uses the SIP header and the CPIM header during a general chat. Even in the case of a chat with a chatbot, the electronic device may use the SIP header and the CPIM header.

In the case of IsComposing event associated with a 1:1 chat, the RCS standard specifies that netwrok (e.g., RCS network) does not use the CPIM header. However, in an embodiment of the present disclosure, as described above, network may use the CPIM header because network does not use the SIP header in a chat between the first type and the second type.

According to an embodiment, in the case of a group chat, when a group chat is started and when a participant is changed during the group chat, a participant list may be exchanged among the electronic device, the server, and/or the chatbot. According to an embodiment, the participant list may be referred to as a "resource list". According to an embodiment, the resource list may be represented as resource list xml. The extension of the participant included in the participant list may be displayed in the resource list.

Figure 9:
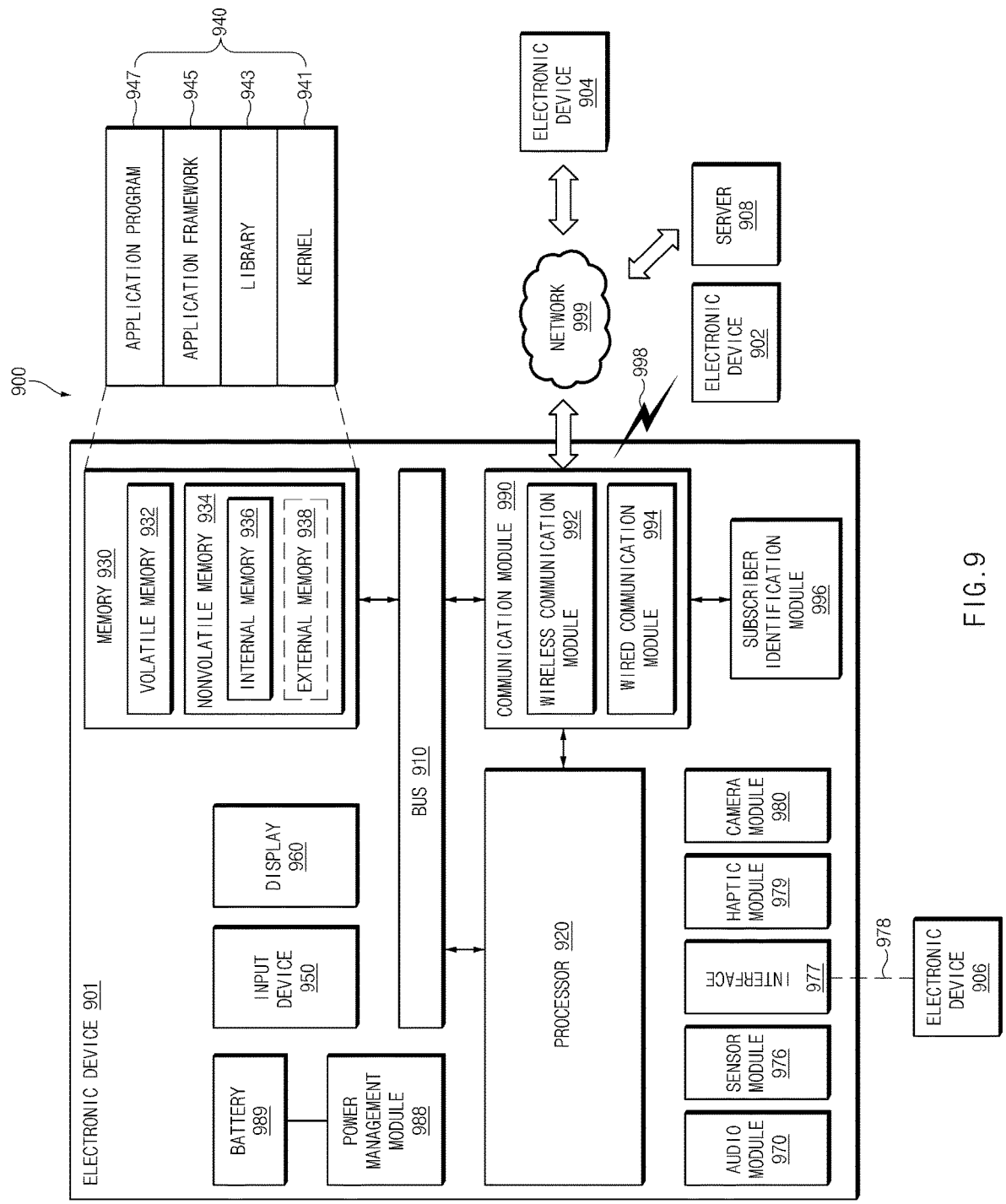
FIG. 9 is a block diagram of an electronic device in a network environment, according to various embodiments.

FIG. 9 illustrates a block diagram of an electronic device 901 in a network environment 900, according to various embodiments. An electronic device according to various embodiments of this disclosure may include various forms of devices.

Referring to FIG. 9, under the network environment 900, the electronic device 901 (e.g., the electronic device 100 of FIG. 1A or the electronic device 100 of FIG. 2) may communicate with an electronic device 902 through local wireless communication 998 or may communication with an electronic device 904 or a server 908 through a network 999. According to an embodiment, the electronic device 901 may communicate with the electronic device 904 through the server 908.

According to an embodiment, the electronic device 901 may include a bus 910, a processor 920 (e.g., the processor 102 of FIG. 2), a memory 930 (e.g., the memory of FIG. 2), an input device 950 (e.g., a micro-phone, virtual keypad or a mouse), a display device 960, an audio module 970, a sensor module 976, an interface 977, a haptic module 979, a camera module 980, a power management module 988, a battery 989, a communication module 990 (e.g., the communication circuit 108 of FIG. 2), and a subscriber identification module 996. According to an embodiment, the electronic device 901 may not include at least one (e.g., the display device 960 or the camera module 980) of the above-described components or may further include other component(s).

The bus 910 may interconnect the above-described components 920 to 990 and may include a circuit for conveying signals (e.g., a control message or data) between the above-described components.

The processor 920 may include one or more of a central processing unit (CPU), an application processor (AP), a graphic processing unit (GPU), an image signal processor (ISP) of a camera or a communication processor (CP). According to an embodiment, the processor 920 may be implemented with a system on chip (SoC) or a system in package (SiP).

The memory 930 may include, for example, the volatile memory 932 or the nonvolatile memory 934. The volatile memory 932 may include, for example, a random access memory (RAM) (e.g., a dynamic RAM (DRAM), a static RAM (SRAM), or a synchronous DRAM (SDRAM)). The nonvolatile memory 934 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 934 may be configured in the form of an internal memory 936 or the form of an external memory 938 which is available through connection only if necessary, according to the connection with the electronic device 901.

The input device 950 may include a microphone, a mouse, or a keyboard. According to an embodiment, the keyboard may include a keyboard physically connected or a virtual keyboard displayed through the display device 960. For example, input device 950 can receive a user selection associated with a first chatbot of one or more chatbots through a user interface displayed on the display device 960.

The display device 960 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display.

The communication module 990 may establish a communication channel between the electronic device 901 and an external device (e.g., the first external electronic device 902, the second external electronic device 904, or the server 908). The communication module 990 may support wired communication or wireless communication through the established communication channel. According to an embodiment, the communication module 990 may include a wireless communication module 992 or a wired communication module 994. The communication module 990 may communicate with the external device through a first network 998 (e.g. a wireless local area network such as Bluetooth or infrared data association (IrDA)) or a second network 999 (e.g., a wireless wide area network such as a cellular network) through a relevant module among the wireless communication module 992 or the wired communication module 994. In certain embodiments, the communication module 990 transmit a first connection request including a first phone number and a first identifier (ID) associated with the first chatbot, to an external server and receive a first connection response including the first phone number and the first ID from the external server.

The wireless communication module 992 may support cellular communication, local wireless communication, or a GNSS communication.

According to an embodiment, the wireless communication module 992 may include a communication processor (CP) separate from the processor 920 (e.g., an application processor (AP)). In this case, the communication processor may perform at least a portion of functions associated with at least one of components 910 to 996 of the electronic device 901 in substitute for the processor 920 when the processor 920 is in an inactive (sleep) state, and together with the processor 920 when the processor 920 is in an active state. According to an embodiment, the wireless communication module 992 may include a plurality of communication modules, each supporting only a relevant communication scheme among cellular communication, local wireless communication, or a GNSS communication.

The wired communication module 994 may include, for example, a local area network (LAN) service, a power line communication, or a plain old telephone service (POTS).

For example, the first network 998 may employ, for example, Wi-Fi direct or Bluetooth for transmitting or receiving commands or data through wireless direct connection between the electronic device 901 and the first external electronic device 902. The second network 999 may include a telecommunication network (e.g., a computer network such as a LAN or a WAN, the Internet or a telephone network) for transmitting or receiving commands or data between the electronic device 901 and the second electronic device 904.

According to various embodiments, the commands or the data may be transmitted or received between the electronic device 901 and the second external electronic device 904 through the server 908 connected with the second network 999. Each of the first and second external electronic devices 902 and 904 may be a device of which the type is different from or the same as that of the electronic device 901. According to various embodiments, all or a part of operations that the electronic device 901 will perform may be executed by another or a plurality of electronic devices (e.g., the electronic devices 902 and 904 or the server 908). To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 930).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 930) in the form of a program module. The instruction, when executed by a processor (e.g., the processor 920), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing;
   a touchscreen display exposed through a part of the housing;
   at least one wireless communication circuit disposed inside the housing;
   at least one processor positioned inside the housing and electrically connected to the touchscreen display and the wireless communication circuit; and
   a memory electrically connected to the at least one processor and positioned inside the housing, wherein the memory stores a user interface for communicating with one or more external chatbots and stores instructions, when executed, that cause the at least one processor to:
   provide the one or more external chatbots through the user interface;
   obtain user selection associated with a first chatbot of the one or more external chatbots, through the user interface;
   transmit a first connection request including a first phone number and a first identifier (ID) associated with the first chatbot, to an external server through the wireless communication circuit; and
   receive a first connection response including the first phone number and the first ID from the external server through the wireless communication circuit.

2. The electronic device of claim 1, wherein the instructions cause the at least one processor to:
   obtain user selection associated with a second chatbot of the one or more external chatbots through the user interface;
   transmit a second connection request including the first phone number and a second ID associated with the second chatbot to the external server through the wireless communication circuit; and
   receive a second connection response including the first phone number and the second ID from the external server through the wireless communication circuit.

3. The electronic device of claim 2, wherein the instructions cause the at least one processor to:

obtain user selection associated with a third chatbot of the one or more external chatbots through the user interface;

transmit a third connection request including a second phone number and a third ID associated with the third chatbot to the external server through the wireless communication circuit; and receive a third connection response including the second phone number and the third ID from the external server through the wireless communication circuit.

4. The electronic device of claim 1, wherein the user interface is a visual user interface and/or a voice-based user interface.

5. The electronic device of claim 1, wherein the memory stores a message application program, and wherein the user interface is a part of the message application program.

6. The electronic device of claim 1, wherein the instructions cause the at least one processor to:

transmit the first connection request through a rich communication service (RCS) network.

7. The electronic device of claim 1, wherein the first connection request is a part of a RCS message including a header, and wherein the first ID is included in the header.

8. The electronic device of claim 7, wherein the header includes a session initiation protocol (SIP) header or a common presence and instant messaging (CPIM) header.

9. The electronic device of claim 1, wherein the instructions cause the at least one processor to:

display the first ID on the user interface.

10. The electronic device of claim 1, wherein the first connection request is a part of an RCS message including payload, and wherein the first ID is included in the payload.

11. The electronic device of claim 1, wherein the instructions cause the at least one processor to:

obtain the first phone number and the first ID from the external server through the wireless communication circuit.

12. The electronic device of claim 11, wherein the first phone number and the first ID are transmitted from the external server through a hypertext transfer protocol (HTTP) message.

13. A server comprising:

at least one communication circuit configured to transmit and/or receive a signal to and/or from an electronic device or one or more chatbots;

at least one processor electrically connected to the communication circuit; and a memory electrically connected to the at least one processor, wherein the memory stores instructions that, when executed, cause the at least one processor to:

obtain a first connection request including a first phone number and a first ID from the electronic device; and identify a first chatbot of the one or more chatbots based on the first phone number and the first ID.

14. The server of claim 13, wherein the instructions cause the at least one processor to:

obtain a second connection request including the first phone number and a second ID from the electronic device; and identify a second chatbot of the one or more chatbots based on the first phone number and the second ID.

15. The server of claim 14, wherein the instructions cause the at least one processor to:

obtain a third connection request including a second phone number and a third ID from the electronic device; and identify a third chatbot of the one or more chatbots based on the second phone number and the third ID.

16. The server of claim 13, wherein the instructions cause the at least one processor to transmit the first connection request to the first chatbot through the at least one communication circuit.

17. The server of claim 16, wherein the first connection request transmitted to the first chatbot includes a location identifier of the first chatbot.

18. The server of claim 17, wherein the location identifier of the first chatbot includes a uniform resource identifier (URI).

19. The server of claim 18, wherein the location identifier of the first chatbot is a part of a hypertext transfer protocol (HTTP) message.

20. The server of claim 13, wherein the first connection request is a part of an RCS message.

* * * * *